US012307140B2

(12) United States Patent
Tokumoto

(10) Patent No.: US 12,307,140 B2
(45) Date of Patent: May 20, 2025

(54) IMAGE FORMING APPARATUS, MULTIFUNCTION PERIPHERAL AND TERMINAL, EXCLUSIVE USAGE MODE CONTROL METHOD, AND COMPUTER READABLE STORAGE MEDIUM

(71) Applicant: CANON KABUSHIKI KAISHA, Tokyo (JP)

(72) Inventor: Hirokazu Tokumoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/451,956

(22) Filed: Aug. 18, 2023

(65) Prior Publication Data
US 2024/0069829 A1  Feb. 29, 2024

(30) Foreign Application Priority Data
Aug. 25, 2022  (JP) .................. 2022-134108

(51) Int. Cl.
*G06F 3/12* (2006.01)
*H04N 1/00* (2006.01)

(52) U.S. Cl.
CPC ....... *G06F 3/1238* (2013.01); *H04N 1/00511* (2013.01); *H04N 1/0097* (2013.01); *G06F 3/1222* (2013.01); *G06F 3/1285* (2013.01); *H04N 2201/0094* (2013.01)

(58) Field of Classification Search
CPC .... G06F 3/1238; G06F 3/1239; G06F 3/1222; H04N 1/0097
See application file for complete search history.

(56) References Cited

U.S. PATENT DOCUMENTS

| | | | |
|---|---|---|---|
| 11,558,513 B2 * | 1/2023 | Liu | H04N 1/00511 |
| 2009/0044130 A1 * | 2/2009 | Saluja | G06F 40/174 |
| | | | 715/750 |
| 2009/0091789 A1 * | 4/2009 | Hosotsubo | H04N 1/00915 |
| | | | 358/1.15 |
| 2015/0341511 A1 * | 11/2015 | Kodimer | H04N 1/00 |
| | | | 358/474 |
| 2015/0365561 A1 * | 12/2015 | Lee | H04N 1/00496 |
| | | | 358/463 |
| 2017/0034377 A1 * | 2/2017 | Hayashi | H04N 1/00811 |
| 2017/0346969 A1 * | 11/2017 | Kaigawa | H04N 1/00416 |
| 2018/0097944 A1 * | 4/2018 | Otake | G06F 3/1203 |
| 2018/0115679 A1 * | 4/2018 | Kusano | H04N 1/00424 |
| 2018/0249022 A1 * | 8/2018 | Webb | H04N 1/00511 |
| 2021/0096786 A1 * | 4/2021 | Kondo | G06F 3/1204 |
| 2022/0345530 A1 * | 10/2022 | Wang | G06F 13/4295 |

FOREIGN PATENT DOCUMENTS

| | | |
|---|---|---|
| JP | 2020052972 A | 4/2020 |
| JP | 2021051811 A | 4/2021 |

* cited by examiner

*Primary Examiner* — Benjamin O Dulaney
(74) *Attorney, Agent, or Firm* — ROSSI, KIMMS & McDOWELL LLP

(57) ABSTRACT

An image forming apparatus includes: a reception unit configured to receive a request from a registered terminal, the request being a request of enabling an exclusive usage mode relating to a printing function for the registered terminal; and an enabling unit configured to enable the exclusive usage mode in a case where the request is received.

17 Claims, 27 Drawing Sheets

IMAGE FORMING APPARATUS, MULTIFUNCTION PERIPHERAL AND TERMINAL, EXCLUSIVE USAGE MODE CONTROL METHOD, AND COMPUTER READABLE STORAGE MEDIUM

BACKGROUND OF THE DISCLOSURE

Field of the Disclosure

The present disclosure relates to an image forming apparatus used to form an image, a multifunction peripheral including the image forming apparatus, and a terminal that uses the image forming apparatus and the multifunction peripheral. Moreover, the present disclosure relates to an exclusive usage mode control method in the image forming apparatus or the multifunction peripheral. Furthermore, the present disclosure relates to a computer readable storage medium.

Description of the Related Art

In recent years, cases where a printer (hereinafter, the "printer" is also referred to as "image forming apparatus") or a multifunction peripheral is used for application of business or study at home are increasing with an increase in chance of teleworking and on-line schooling. As a result, the printer and the multifunction peripheral are increasingly used for various applications by multiple users at home. As a measure against multi-user multi-use of the printer or the multifunction peripheral as described above, as described in Japanese Patent Laid-Open Nos. 2020-52972 (hereinafter, referred to as Literature 1) and 2021-51811 (hereinafter, referred to as Literature 2), usability is improved by switching tabs in a display screen on an operation panel depending specific processing or a user using the printer or the multifunction peripheral.

However, in the case where multiple users use the printer or the multifunction peripheral in multiple applications while switching the tabs in the display screen as in Literature 1 and Literature 2, paper sheets printed according to operations of separate users are discharged from the printer or the multifunction peripheral in a mixed manner. As a result, there occurs a security problem from the viewpoint of preventing leakage of classified documents. For example, there occurs a situation in which a first user causes a printer to print a classified document from a first terminal in application of business, and a second user causes the same printer to print materials for study from a second terminal at home. Moreover, there occurs a situation in which the first user causes the printer to print the classified documents from the first terminal in the application of business, and the second user causes the same printer to print the materials for study by operating an operation panel of the printer. In these situations, as a result of discharging of the paper sheets relating to the two users from the printer in a mixed manner, there is a possibility of occurrence of a security problem in which the printed classified document is taken away by the second user together with the printed materials for study. The same applies to the multifunction peripheral.

SUMMARY OF THE DISCLOSURE

An image forming apparatus according to the present disclosure includes: a reception unit configured to receive a request from a registered terminal, the request being a request of enabling an exclusive usage mode relating to a printing function for the registered terminal; and an enabling unit configured to enable the exclusive usage mode in a case where the request is received.

Further features of the present disclosure will become apparent from the following description of exemplary embodiments with reference to the attached drawings.

DESCRIPTION OF THE EMBODIMENTS

Figure 1:
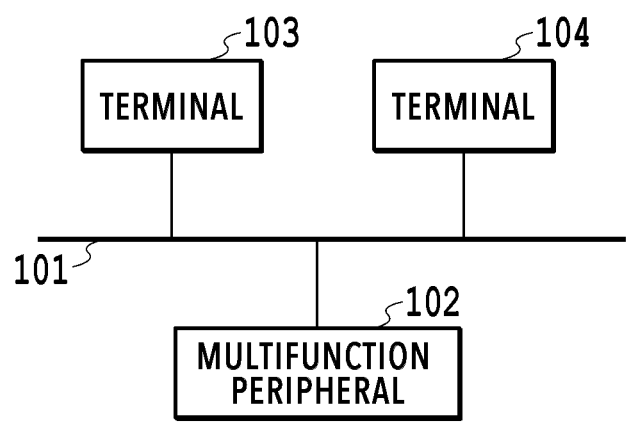
FIG. 1 is a conceptual diagram illustrating a multifunction peripheral, a computer, and a network connecting the multifunction peripheral and the computer according to embodiments.

Embodiments of the present disclosure are described below with reference to the drawings. Note that the following embodiments do not limit the present disclosure, and not all of combination of features described in the present embodiments are necessarily essential for solving means of the present disclosure. The same configurations are described by being denoted by the same reference numerals.

1 COMMON EMBODIMENT

1.1 Configuration of Network

FIG. 1 illustrates a configuration example of a network in the present embodiments. A multifunction peripheral 102 is connected to a terminal 103 and a terminal 104 via a network 101 such as a LAN. As described later, the multifunction peripheral 102 has not only an image forming function (printing function) but also other functions such as an image reading function, an image saving function, an image copying function, and a communication function. The terminals 103 and 104 are, for example, personal computers, but may be other types of terminals such as mobile phones. The multifunction peripheral 102 can basically execute printing based on print jobs sent from the terminal 103 and the terminal 104. Moreover, the terminal 103 and the terminal 104 can be basically remotely connected to the multifunction peripheral 102. In the case where the terminal 103 or the terminal 104 is remotely connected to the multifunction peripheral 102, a screen similar to a screen displayed on an operation panel of the multifunction peripheral 102 is displayed in the terminal 103 or 104. Moreover, in the case where the terminal 103 or the terminal 104 is remotely connected to the multifunction peripheral 102, the multifunction peripheral 102 can activate the aforementioned functions based on an instruction from the terminal 103 or the terminal 104. Although there are only two terminals connected to the multifunction peripheral 102 via the network 101 in FIG. 1, one terminal or three or more terminals may be connected to the multifunction peripheral 102 via the network 101.

1.2 Configuration of Multifunction Peripheral

Figure 2:
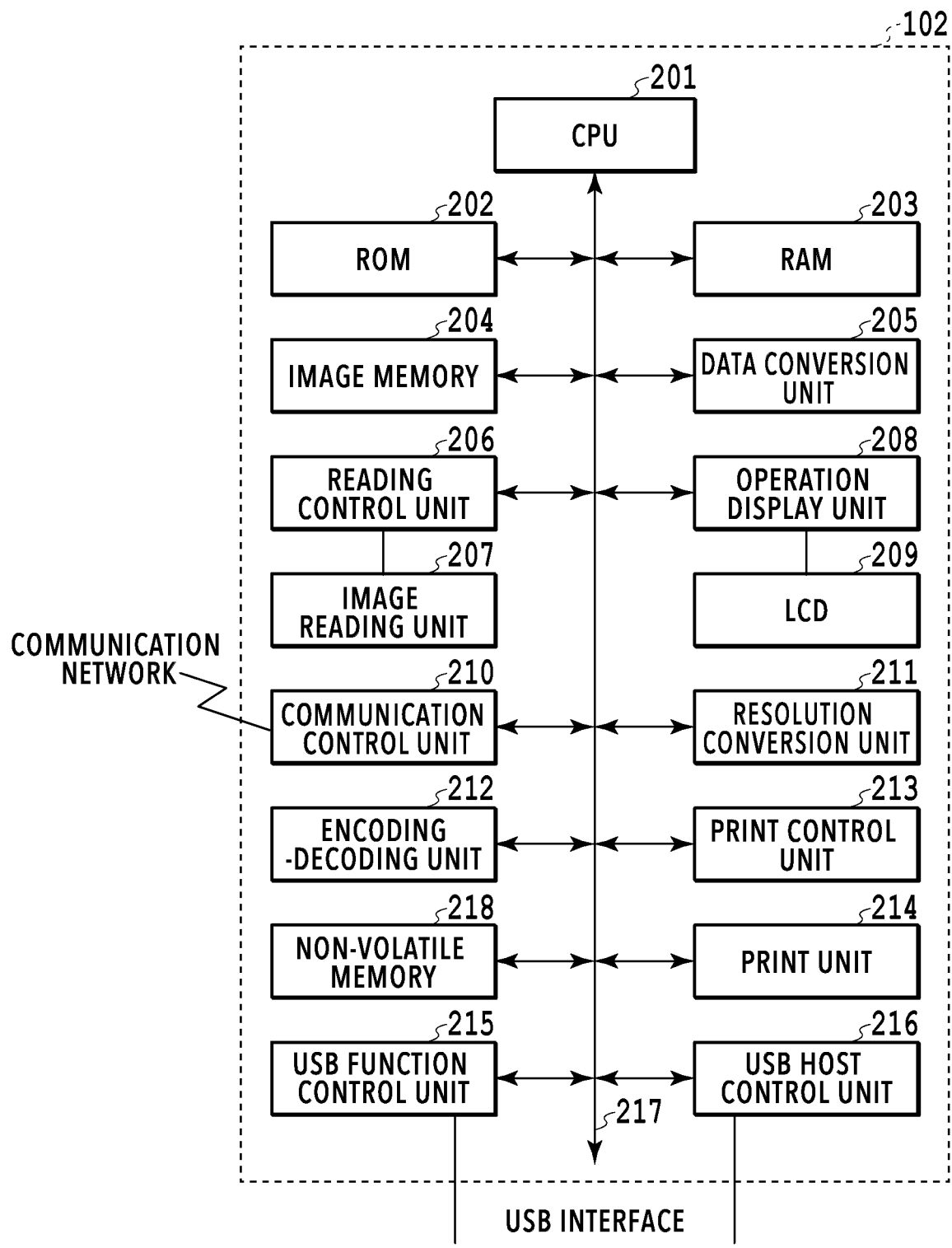
FIG. 2 is a functional block diagram illustrating a configuration of the multifunction peripheral according to the embodiments.

FIG. 2 is a block diagram illustrating a schematic configuration example of the multifunction peripheral 102 in the present embodiments. The multifunction peripheral 102 is one type of information processing apparatus. Moreover, the multifunction peripheral 102 is one type of electronic device. The multifunction peripheral 102 of the present embodiments has information processing functions such as generation, storage, and sending of device information including log information and status information. Moreover, the multifunction peripheral 102 has an image forming function of forming an image on a print medium by using a print control unit 213 and a print unit 214 to be described later.

The multifunction peripheral 102 includes a CPU 201, a ROM 202, a RAM 203, an image memory 204, a data conversion unit 205, a reading control unit 206, an image reading unit 207, an operation display unit 208, an LCD 209, a communication control unit 210, and a resolution conversion unit 211. The multifunction peripheral 102 also includes an encoding-decoding unit 212, the print control unit 213, the print unit 214, a USB function control unit 215, a USB host control unit 216, a bus 217, and a non-volatile memory 218.

The CPU 201 is a system control unit, and controls the entire multifunction peripheral 102. The ROM 202 is a non-volatile memory that stores fixed data such as control programs to be executed by the CPU 201, a data table, and an embedded operating system (OS). In the present embodiments, the CPU 201 executes each of the control programs stored in the ROM 202 under management of the embedded OS stored in the ROM 202. The CPU 201 thereby performs software execution control such as scheduling, task switching, and interruption processing. Information indicating a permission state describing whether the device information is to be provided to the outside is stored in the ROM 202. The RAM 203 is formed of members such as a static random access memory (SRAM) that requires a backup power supply. The power feed to the RAM 203 is ensured by a not-illustrated primary battery for data backup. Program control variables and the like are stored in the RAM 203. The image memory 204 is formed of a dynamic random access memory (DRAM) and the like, and can store image data. Moreover, a partial region of the image memory 204 is secured as a business region for execution of software processing. The data conversion unit 205 can analyze page description language (PDL) or perform conversion of image data such as computer graphic (CG) development of character data.

The image reading unit 207 optically reads an original by using a CIS image sensor, and converts the original into an electrical image signal. The reading control unit 206 performs various types of image processing such as binarization processing and halftone processing on this image signal, and outputs high-definition image data. Note that the method of optically reading an original may be either a sheet reading control method in which a fixed CIS image sensor reads an original or a book reading control method in which a moving CIS image sensor reads an original fixed on a platen glass.

The operation display unit 208 is formed of minimal required keys such as numeral value input keys, a mode setting key, a determination key, and a cancel key, a light-emitting diode (LED), a seven-segment display unit, and the like. The aforementioned various keys may be implemented by so-called software keys displayed on the LCD 209, and receive operations from a user. The LCD 209 switches off a backlight of the LCD 209 in the case where no user operation is performed for a predetermined time to reduce power consumption.

The communication control unit 210 controls communication between the multifunction peripheral 102 and a communication network 300 to achieve connection to an Internet service provider or to communicate various types of data with a service management server 200. Moreover, the communication control unit 210 can determine whether the multifunction peripheral 102 is connected to the Internet or is connected only to a LAN. Note that the connection between the communication control unit 210 and the communication network 300 is assumed to be based on a publicly-known method such as HTTP or XMPP. The resolution conversion unit 211 performs resolution conversion processing such as interconversion between millimeter-based image data and inch-based image data. Note that the resolution conversion unit 211 can also execute scaling processing of image data. The encoding-decoding unit 212 performs encoding-decoding processing and scaling processing on image data (uncompressed, MH, MR, MMR, JBIG, JPEG, or the like) handled in the multifunction peripheral 102. The print control unit 213 performs various types of image processing such as smoothing processing, print density correction processing, and color correction on image data to be printed to convert the image data to high-definition image data, and outputs the image data to the print unit 214. Moreover, the print control unit 213 also has a role of regularly obtaining status information data of the print unit 214. The print unit 214 is formed of a laser beam printer, an ink jet printer, or the like, and prints the image data generated in the print control unit 213 onto a print medium such as a printing paper.

The USB function control unit 215 performs protocol control according to a USB communication standard. The USB host control unit 216 is a control unit for performing communication under a protocol defined in the USB communication standard. This USB communication standard is a standard for bi-directional high-speed data communication, and defines that multiple hubs or functions (slaves) can be connected to one host (master). Specifically, the USB host control unit 216 provides a function of a host in USB communication.

The non-volatile memory 218 is a non-volatile memory that stores data obtained from the network, setting of the information processing apparatus, and the like. The configurations other than the image reading unit 207 and the LCD 209 are connected to one another via the bus 217.

Figure 3:
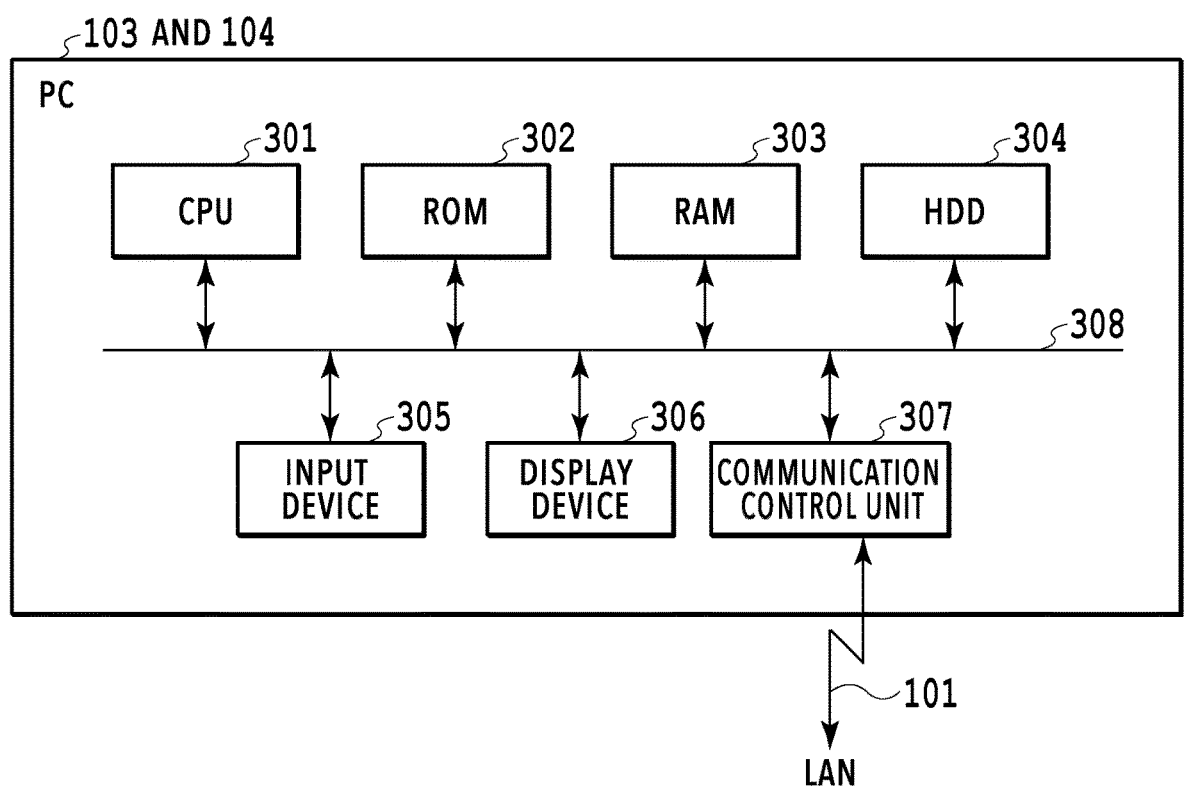
FIG. 3 is a functional block diagram illustrating a configuration of a terminal according the embodiments.

FIG. 3 is a diagram illustrating an overall configuration of each of the terminals 103 and 104. In each of the terminals 103 and 104, a CPU 301 is a computation device that controls an entire system. A ROM 302 stores programs and data relating to each type of processing. A RAM 303 is a system business memory for operation of the CPU, and is a storage memory that stores temporal data relating to each type of processing. The hard disk drive (HDD) 304 stores programs and data relating to each type of processing, temporal data, application data, and the like. An input device 305 is a keyboard and a pointing device that receive input of instructions into the present apparatus. A display device 306 displays an operation status of the present apparatus and information outputted by each program operating on the present apparatus. A communication control unit 307 is connected to a network (LAN) 105, and exchanges information with the other terminals and the image forming apparatus connected to the same LAN. The aforementioned elements are arranged on a system bus 308. A media access control (MAC) address ("communication device identification number" in the present disclosure) is assigned to the communication control unit 307. Accordingly, each of the terminals 103 and 104 has a MAC address assigned to the terminal itself.

Note that the CPU 301 executes processing based on an operating system (OS), a printer driver, and programs such as a remote connection program stored in the HDD 304. Functions (or processing) provided by the OS, the printer driver, and the remote connection program are thereby implemented.

1.3 Operation Panel

The operation panel of the multifunction peripheral 102 according to the present embodiments includes the LCD 209 and a colorless transparent touch sensor superimposed on the LCD 209. The LCD 209 and the touch sensor also form the aforementioned software keys.

Tab format home screens 400 are basically displayed on the operation panel.

Figure 4:
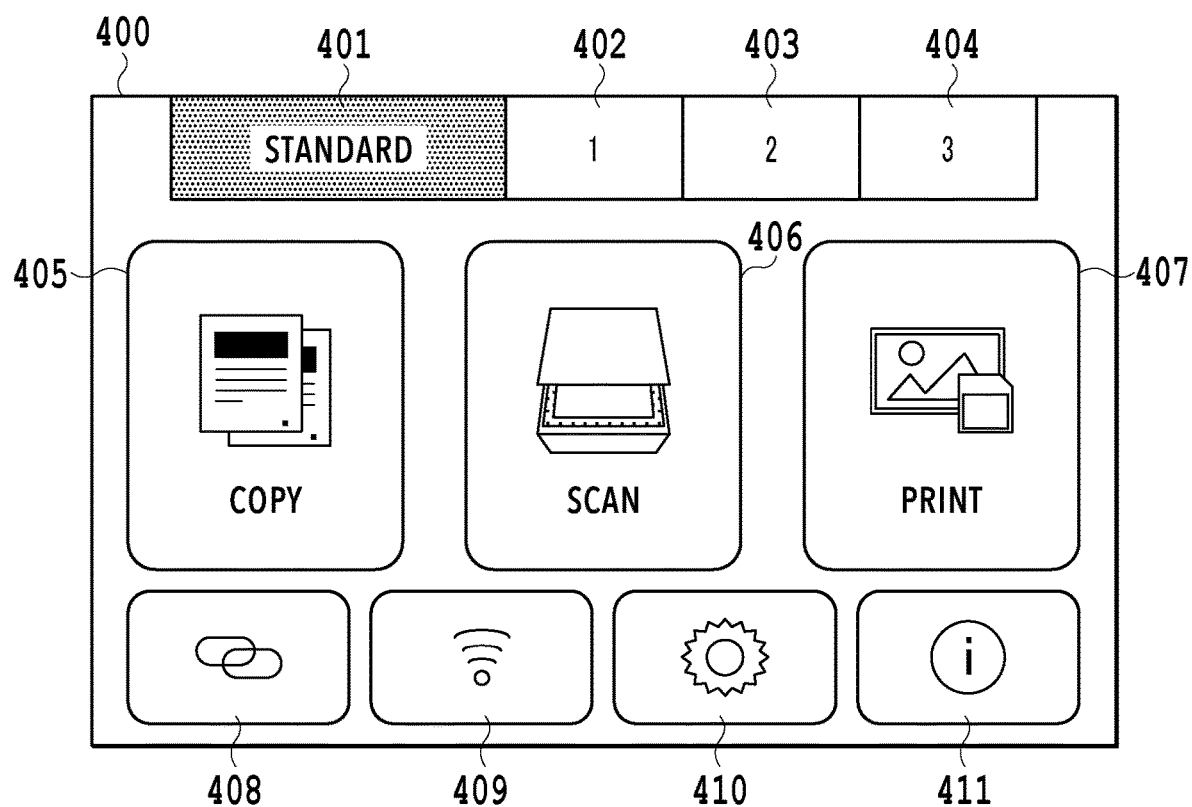
FIG. 4 is a diagram illustrating a standard home screen displayed on an operation panel included in the multifunction peripheral according to the embodiments.

FIG. 4 is a diagram illustrating a standard home screen that is one of the home screens 400. A tab 401 is a tab corresponding to the standard home screen. Tabs 402, 403, and 404 are tabs corresponding to custom home screens illustrated in FIGS. 5 to 7, respectively. The user can switch the home screen by pressing the tabs. In the example illustrated in FIG. 4, the color of the tab 401 is different from the colors of the other tabs 402, 403, and 404 to indicate that the standard home screen is displayed. A copy menu button 405, a scan menu button 406, a print menu button 407, an LAN button 408, a wireless connection button 409, a setting button 410, and a hint button 411 are buttons corresponding to the respective menus. In the case where the user presses any of the buttons, the screen transitions to the corresponding menu.

Figure 5:
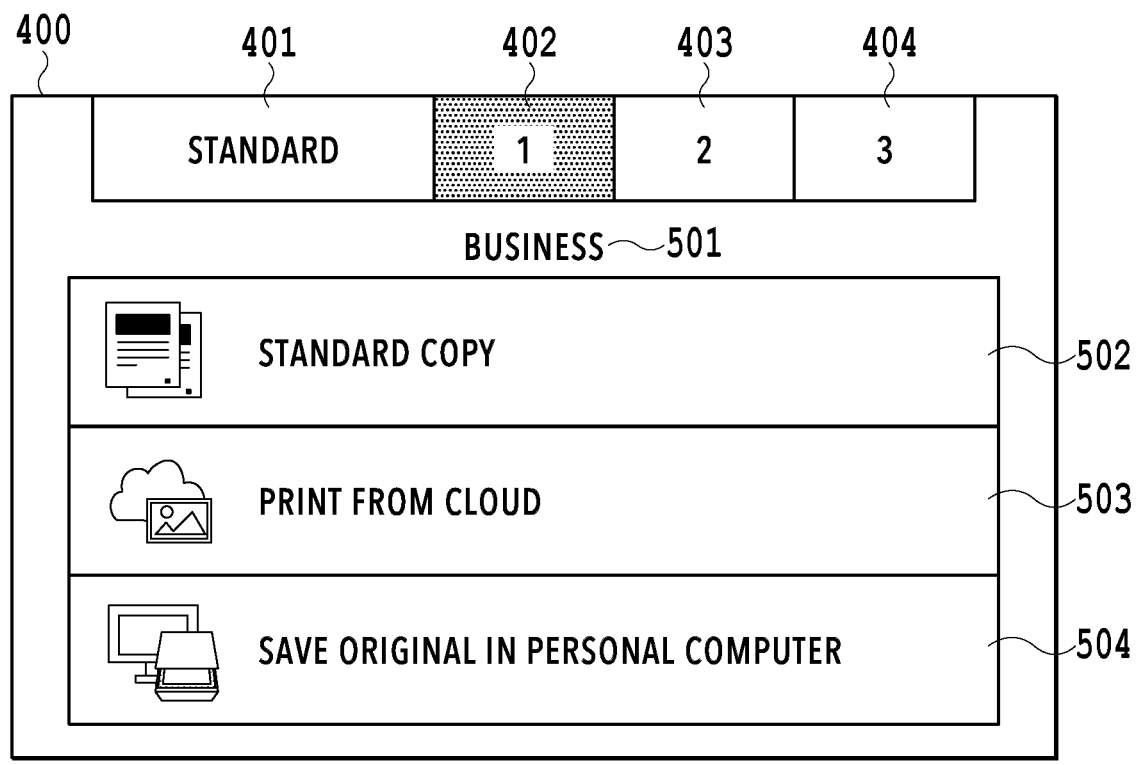
FIG. 5 is a diagram illustrating a first custom home screen displayed on the operation panel included in the multifunction peripheral according to the embodiments.
Figure 6:
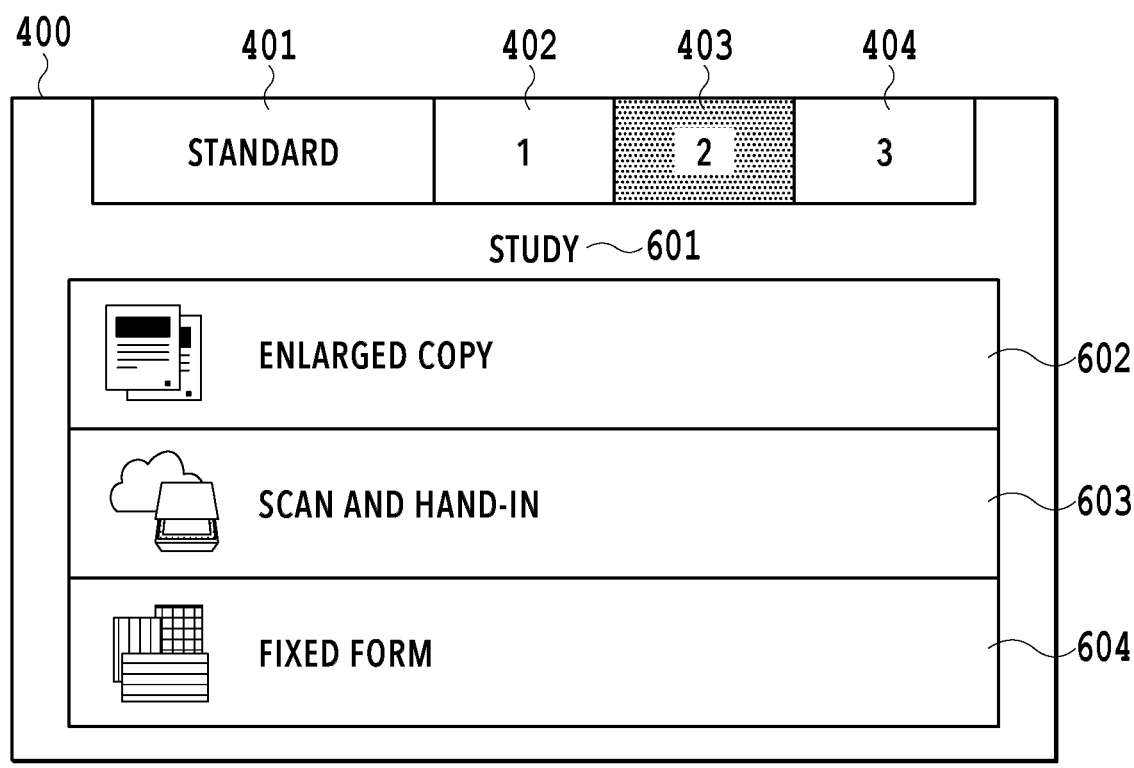
FIG. 6 is a diagram illustrating a second custom home screen displayed in a normal state on the operation panel included in the multifunction peripheral according to the embodiments.
Figure 7:
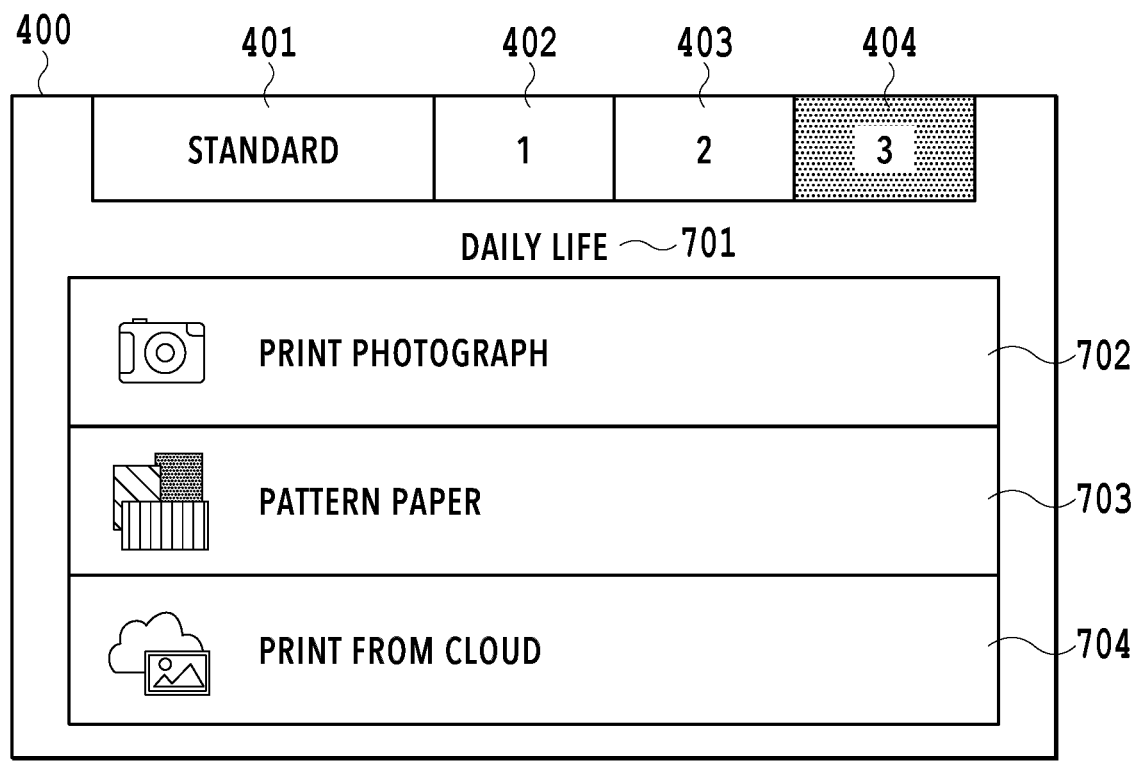
FIG. 7 is a diagram illustrating a third custom home screen displayed on the operation panel included in the multifunction peripheral according to the embodiments.

The home screens 400 include the three custom home screens illustrated in FIGS. 5 to 7 in addition to the standard home screen illustrated in FIG. 4. FIGS. 5 to 7 illustrate custom home screens associated with the tabs 402 (name "1"), 403 (name "2"), and 404 (name "3"), respectively.

In the custom home screen illustrated in FIG. 5, the color of the tab 402 is different from the colors of the other tabs 401, 403, and 404, and a title 501 "business" is displayed. Accordingly, it can be found that the custom home screen illustrated in FIG. 5 is a custom home screen relating to business. In the custom home screen illustrated in FIG. 6, the color of the tab 403 is different from the colors of the other tabs 401, 402, and 404, and a title 601 "study" is displayed. Accordingly, it can be found that the custom home screen illustrated in FIG. 6 is a custom home screen relating to study. In the custom home screen illustrated in FIG. 7, the color of the tab 404 is different from the colors of the other tabs 401, 402, and 403, and a title 701 "daily life" is displayed. Accordingly, it can be found that the custom home screen illustrated in FIG. 7 is a custom home screen relating to daily life. Note that the titles 501, 601, and 701 can be customized by a user operation.

In the custom home screen illustrated in FIG. 5 and relating to "business", custom menus 502, 503, and 504 are displayed. Similarly, in the custom home screen illustrated in FIG. 6 and relating to "study", custom menus 602, 603, and 604 are displayed. In the custom home screen illustrated in FIG. 7 and relating to "daily life", custom menus 702, 703, and 704 are displayed. A name or a summary sentence is displayed in each of these custom menus, and a function expressed by this name or summary sentence is assigned to the menu.

Specifically, a function of standard copy is assigned to the custom menu 502 arranged in the custom home screen illustrated in FIG. 5 and relating to "business". Moreover, a function of printing from a cloud is assigned to the custom menu 503 arranged in the same screen. Furthermore, a function of saving an original in a personal computer is assigned to the custom menu 504 arranged in the same screen.

A function of enlarged copy is assigned to the custom menu 602 arranged in the custom home screen illustrated in FIG. 6 and relating to "study". Moreover, a function of scanning and handing-in (that is, a function of scanning and printing) is assigned to the custom menu 603 arranged in the same screen. Furthermore, a function of a fixed form (that is, a function of printing a printed matter of a predetermined design) is assigned to the custom menu 604 arranged in the same screen.

A function of photography printing is assigned to the custom menu 702 arranged in the custom home screen illustrated in FIG. 7 and relating to "daily life". Moreover, a function of pattern paper (that is, a function of printing a printed matter with a predetermined design) is assigned to the custom menu 703 arranged in the same screen. Furthermore, a function of printing from a cloud is assigned to the custom menu 704 arranged in the same screen.

Note that the name or summary sentence displayed on each custom menu and the function of each custom menu can be customized by user operations.

In the case where the terminal 103 is connected to the multifunction peripheral 102 via the LAN 101, the multifunction peripheral 102 can display a screen similar to the screen displayed on the operation panel also on the display device 306 of the terminal 103, and perform operations according to an operation made on the screen. This function is referred to as remote connection function. In this case, the screen displayed on the operation panel includes the home screens 400, and may include the other screens to be described later.

Figure 9:
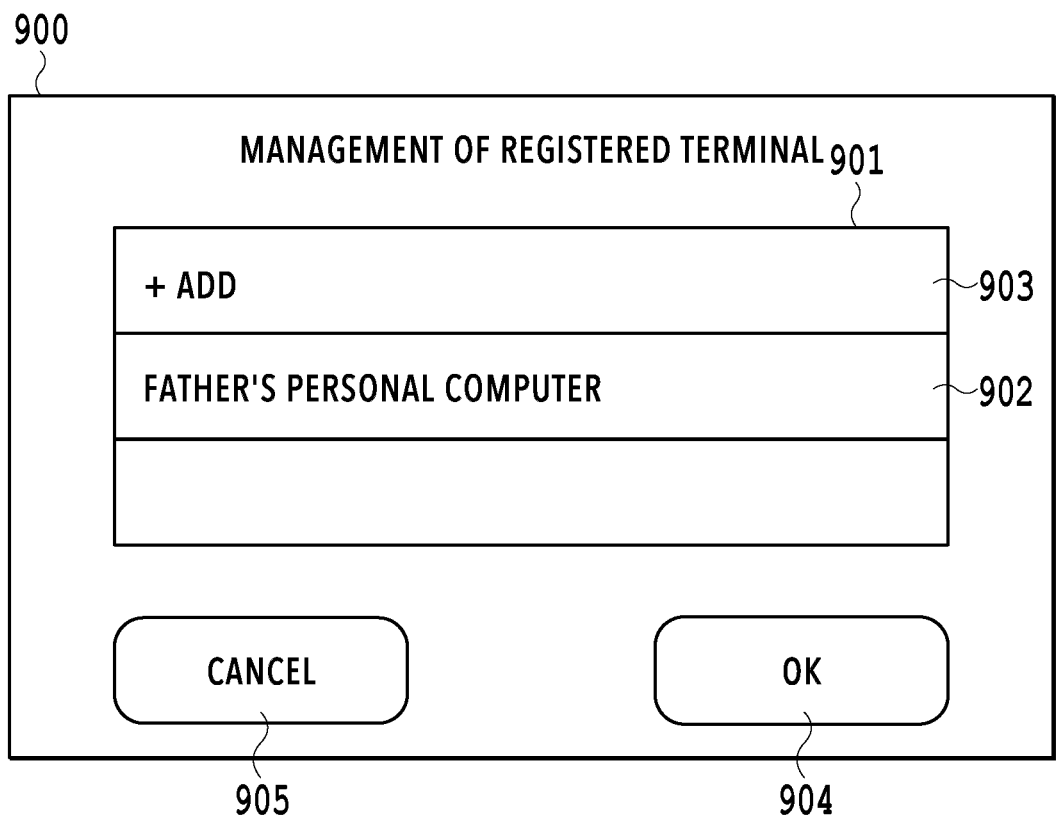
FIG. 9 is a diagram illustrating a screen that is displayed on the operation panel included in the multifunction peripheral according to the embodiments and that is used to manage the terminal using the exclusive usage mode.
Figure 10:
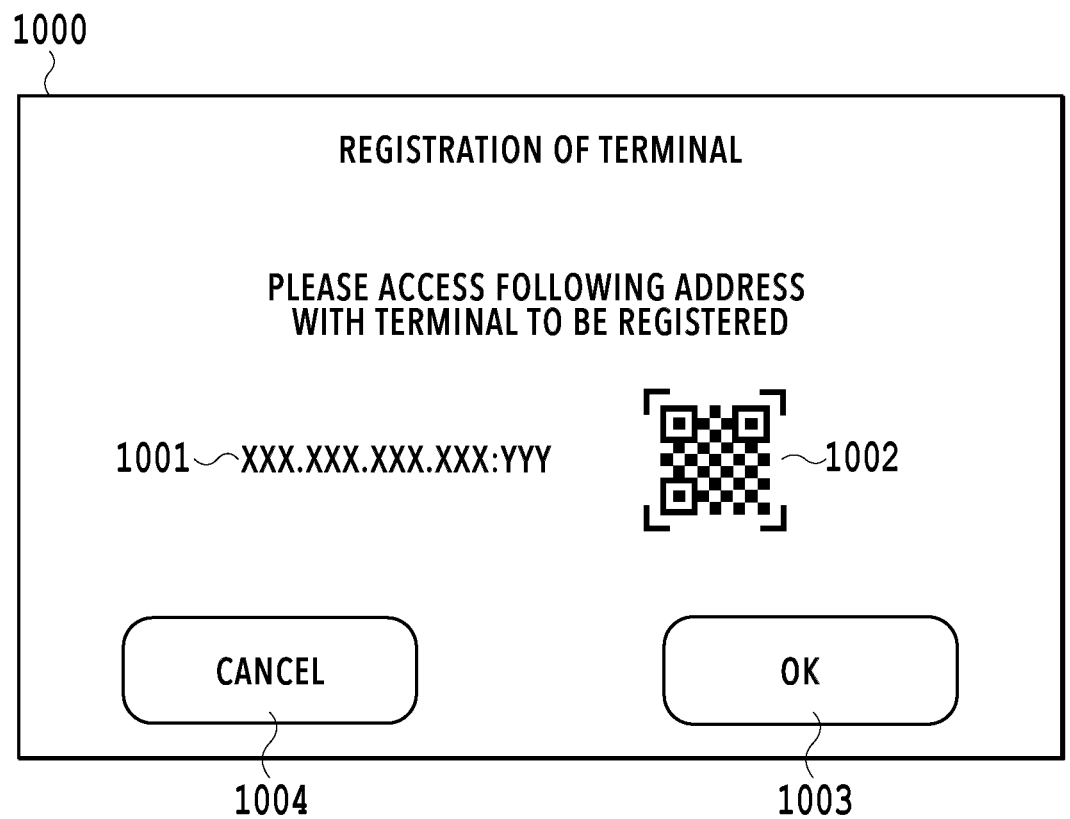
FIG. 10 is a screen that is displayed on the operation panel included in the multifunction peripheral according to the embodiments and that displays a network; address of the multifunction peripheral and an exclusive usage connection port number.
Figure 11:
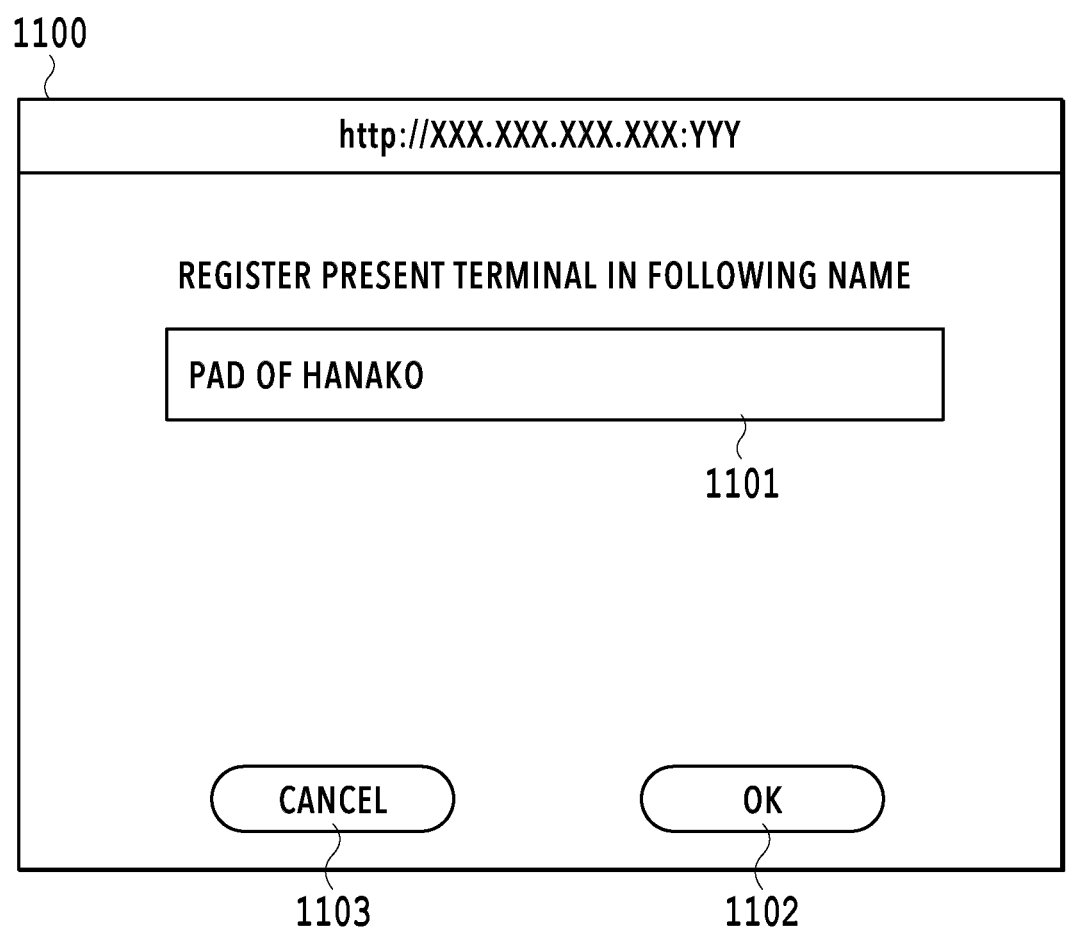
FIG. 11 is a screen displayed on a screen of the terminal in the case where the terminal is to be registered in the multifunction peripheral in the embodiments.

FIGS. 8 to 11 illustrate screens used to set an exclusive usage mode of the multifunction peripheral 102. The screens illustrated in FIGS. 8 to 11 are displayed on the operation panel of the multifunction peripheral 102, and the screen illustrated in FIG. 11 is displayed on the display device 306 of the terminal 103.

Figure 8:
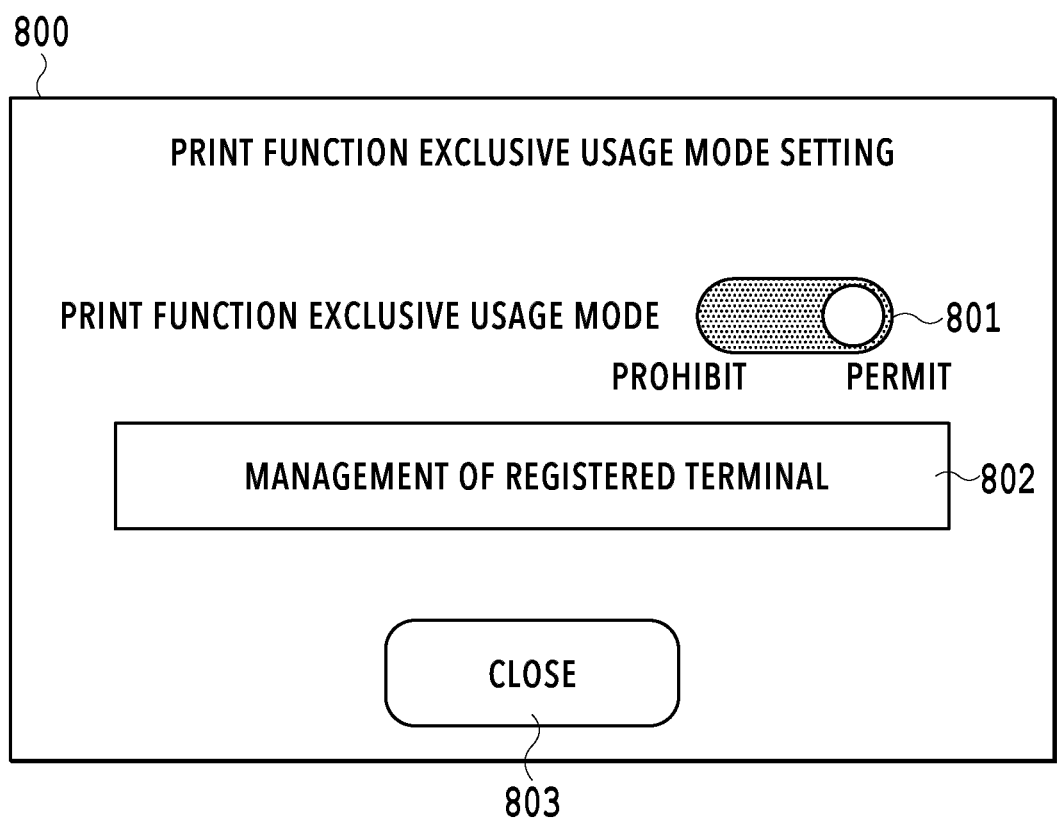
FIG. 8 is a diagram illustrating a screen that is displayed on the operation panel included in the multifunction peripheral according to the embodiments and that is mainly used to switch permit/prohibit of an exclusive usage mode.

First, types of terminals are briefly described. The user can set any terminal as a registered terminal by performing a series of processes starting from pressing of a "+ add" button 902 arranged in the first low of a list 901 of a screen 900 illustrated in FIG. 9. Accordingly, there are one or multiple registered terminals. Moreover, the user can select one of the registered terminals in the list 901 of the screen 900 illustrated in FIG. 9, and press an "OK" button 904 to set the selected registered terminal as a selected terminal. In this case, the selected terminal is a terminal selected as a terminal that can use the exclusive usage mode. In the case where the "OK" button 904 is pressed, a screen 800 illustrated in FIG. 8 is displayed, but the selected terminal is maintained as it is. In a period in which an exclusive usage mode permit/prohibit switch 801 of the screen 800 is switched to "prohibit", the selected terminal is maintained as the selected terminal. However, in the case where the exclusive usage mode permit/prohibit switch 801 is switched to "permit", the selected terminal is set as a permitted terminal. The permitted terminal is a terminal that is permitted to exclusively use the printing function of the multifunction peripheral 102 and functions including the printing function. However, merely switching the exclusive usage mode permit/prohibit switch 801 to "permit" does not allow the permitted terminal to exclusively use these functions. As described later, the exclusive usage mode is enabled and the permitted terminal is switched to an exclusive usage terminal by, for example, connecting the permitted terminal to the multifunction peripheral 102, then sending an exclusive usage start request to the multifunction peripheral 102, and then executing a series of processes. Note that, hereinafter, the printing function and the like refers to both of the printing function and the functions (for example, copy function) including the printing function.

FIG. 8 illustrates the screen 800 mainly used to switch permit/prohibit of the exclusive usage mode relating to the printing function and the like of the multifunction peripheral 102. The exclusive usage mode permit/prohibit switch 801 is a switch for switching permit/prohibit of the exclusive usage mode relating to the printing function and the like of the multifunction peripheral 102. The user who desires to exclusively use the printing function and the like of the multifunction peripheral 102 switches the exclusive usage mode permit/prohibit switch 801 from "prohibit" to "permit". Moreover, the user who desires to cancel the exclusive usage of the printing function and the like of the multifunction peripheral 102 switches the exclusive usage mode permit/prohibit switch 801 from "permit" to "prohibit". A "close" button 803 is used to close the screen 800.

In the case where the exclusive usage mode permit/prohibit switch 801 is at "prohibit", the registered terminal selected in the screen 900 illustrated in FIG. 9 is the selected terminal. In the case where the exclusive usage mode permit/prohibit switch 801 is at "permit", the registered terminal selected in the screen 900 illustrated in FIG. 9 is the permitted terminal.

Moreover, as described later, merely switching the exclusive usage mode permit/prohibit switch 801 to "permit" only "permits" the exclusive usage mode, and does not "enable" the exclusive usage mode. The multifunction peripheral 102 enables the exclusive usage mode in the case where the multifunction peripheral 102 receives a request from the permitted terminal from which the multifunction peripheral 102 is allowed to accept a request in a period in which the exclusive usage mode permit/prohibit switch 801 is switched to "permit". In this case, the permitted terminal becomes the exclusive usage terminal.

A "management of registered terminals" button 802 is used to display the screen 900 illustrated in FIG. 9 for setting and managing the permitted terminals that are permitted to use the exclusive usage mode and the registered terminals that can be set as the permitted terminals.

With reference to FIG. 9, the list 901 of the registered terminals is displayed on the screen 900. The "+ add" button 902 is arranged in the first row of the list 901. For example, a terminal with a name "father's personal computer" is displayed in the second row of the list 901 as the registered terminal. In the screen illustrated in FIG. 9, the terminal with the name "father's personal computer" is the only registered terminal.

In the case where the "OK" button 904 is pressed while the terminal with the name "father's personal computer" in the list 901 of the screen 900 is selected, the registered terminal with the name "father's personal computer" is set as the selected terminal. Then, the screen 900 is closed, and the screen 800 is displayed.

Note that, in the case where there are multiple registered terminals, the multiple registered terminals are displayed in the list 901 of the screen 900. In the case where the user selects one of the multiple terminals and presses the "OK" button 904, the selected registered terminal becomes the selected terminal.

In the case where the "+ add" button 902 of the screen 900 is pressed, the screen 900 is closed, and a screen 1000 for terminal registration as illustrated in FIG. 10 is displayed. A title "registration of terminal" and a guide text "please access following address with terminal to be registered" are displayed in the screen 1000. Furthermore, a set 1001 of an address (IP address) of the multifunction peripheral 102 in the network 101 and a number of a port (exclusive usage connection port number) to be used in the exclusive usage mode is displayed in the screen 1000. Moreover, a QR code (registered trademark) 1002 obtained by encoding this set is also displayed. In the example of FIG. 10, XXX.XXX.XXX.XXX is the IP address, and YYY is the exclusive usage connection port number. A numerical value is placed in each of the Xs and Ys. Instead of XXX.XXX.XXX.XXX, a character string associated with these numerical values in the LAN 101 may be placed. The exclusive usage connection port herein may be used for acceptance of a registration request from the terminal 103 by the multifunction peripheral 102. In this case, the registration request is a request made by the terminal to set the terminal itself as the registered terminal. Moreover, the exclusive usage connection port herein is used to accept the exclusive usage start request, an exclusive usage termination request, and a print job in the exclusive usage mode from the permitted terminal. Furthermore, the exclusive usage connection port herein may be used for remote connection in the exclusive usage mode. In this case, the exclusive usage start request is a request sent by the permitted terminal to the multifunction peripheral 102 to exclusively use the printing function and the like of the multifunction peripheral 102. Moreover, the exclusive usage termination request is a request sent by the exclusive usage terminal to the multifunction peripheral 102 to terminate the exclusive usage of the printing function and the like of the multifunction peripheral 102.

The user inputs the set of the IP address of the multifunction peripheral 102 in the network 101 and the exclusive usage connection port number into an address input field of a WEB browser in the terminal according to the guide text in the screen 1000. Specifically, the user inputs XXX.XXX.XXX.XXX:YYY described above into this address input field. Then, the request is sent to the multifunction peripheral 102 with a port YYY being the destination port, and a program for terminal registration (hereinafter, referred to as "terminal registration program") for the port YYY is activated in the multifunction peripheral 102.

The terminal registration program obtains a MAC address assigned to the terminal, from the terminal. Then, the terminal registration program sends a terminal name input form screen 1100 as illustrated in FIG. 11 to the terminal. In the case where the user inputs a name of the terminal determined by the user into a text box 1101 in the terminal name input form screen 1100 and presses an "OK" button, the name of the terminal is sent to the multifunction peripheral 102. Then, the terminal registration program registers the terminal in the non-volatile memory 218 by using the set of the MAC address and the name of the terminal. This terminal thereby becomes the registered terminal. Details of this operation are described later with reference to FIG. 14.

The configuration may be such that a program sent together with the terminal name input form screen 1100 obtains the name of the terminal, from the terminal, and sets the obtained name as an initial value of the text box 1101 in FIG. 11.

Figure 12:
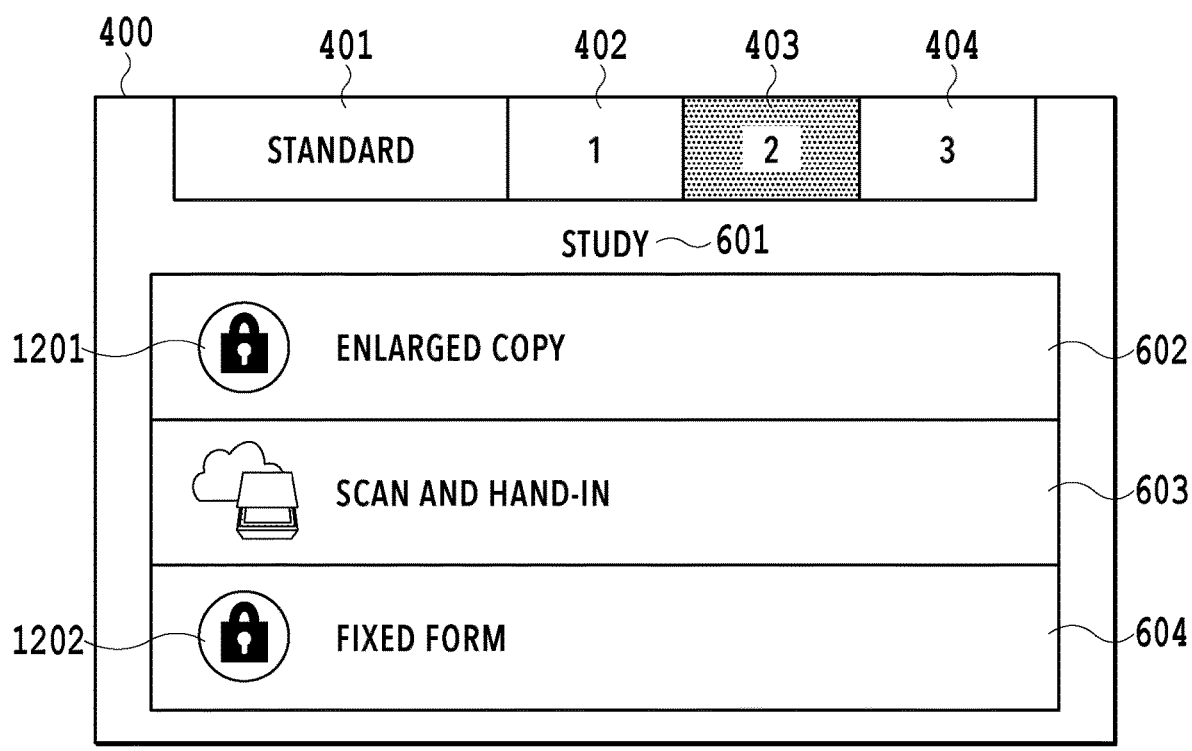
FIG. 12 is a diagram illustrating the second custom home screen displayed in the exclusive usage mode on the operation panel included in the multifunction peripheral according to the embodiments.

FIG. 12 is a custom home screen relating to study and displayed on the operation panel of the multifunction peripheral 102 in a period in which the exclusive usage mode is enabled (exclusive usage enabled period). In a period in which the exclusive usage mode is not enabled (exclusive usage disabled period), the custom home screen relating to study is as illustrated in FIG. 6. As described above, the function of enlarged copy is assigned to the custom menu 602. Since the function of enlarged copy is a function achieved by combining the scan function and the printing function, the function of enlarged copy includes the printing function. Accordingly, in the exclusive usage mode, the function of enlarged copy needs to be prohibited. Thus, the custom menu 602 is disabled, and an icon 1201 indicating this disablement is displayed. Moreover, as described above, the function of fixed form is assigned to the custom menu 604. Since the function of fixed form is a function achieved by using the printing function, the function of fixed form includes the printing function. Accordingly, in the exclusive usage mode, the function of fixed form needs to be prohibited. Thus, the custom menu 604 is disabled, and an icon 1202 indicating this disablement is displayed.

Figure 13:
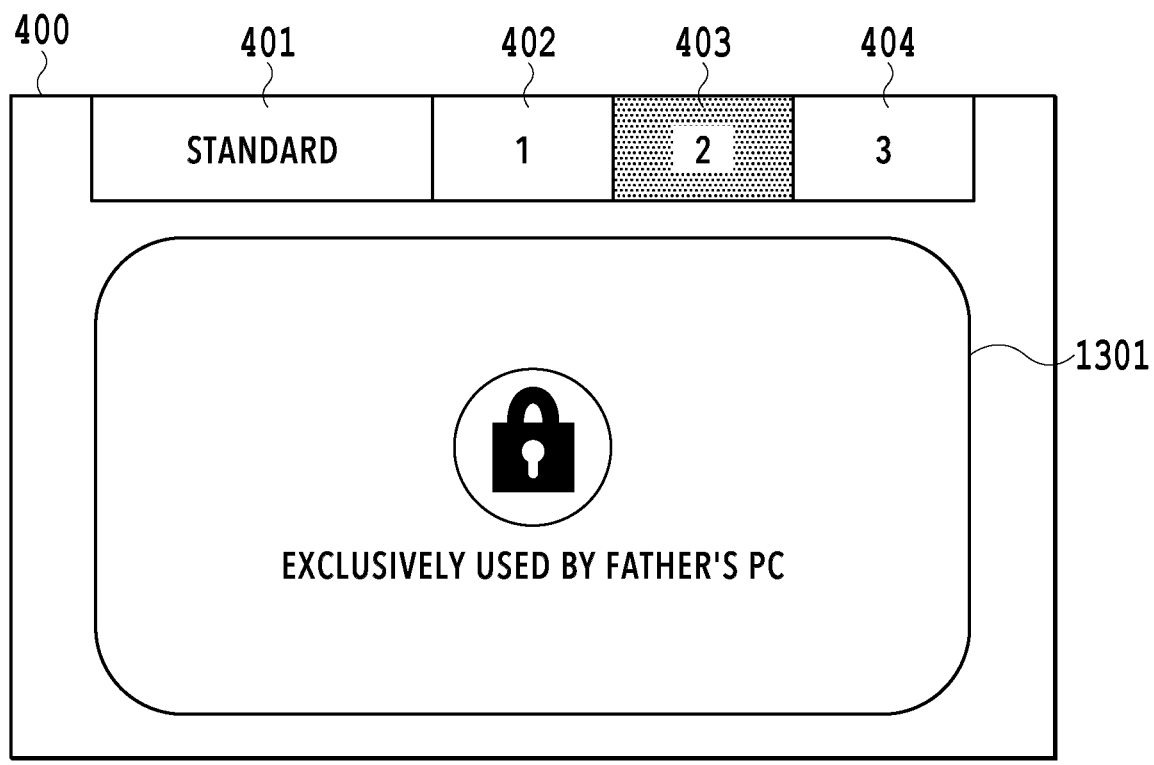
FIG. 13 is a diagram illustrating a screen that is displayed on the operation panel included in the multifunction peripheral according to the embodiments and that indicates exclusive usage of the multifunction peripheral.

Moreover, in the case where the user erroneously selects the custom menu 602 or 604, a screen 1301 as illustrated in FIG. 13 is displayed by being superimposed on the custom home screen. The screen 1301 includes an icon for calling attention and a message of "exclusively used by father's PC". Members of the family of the father can thereby know that the multifunction peripheral 102 is exclusively used by the father's PC and the function corresponding to the custom menu 602 or 604 cannot be used.

Note that, although the function of scanning and handing-in is assigned to the custom menu 603 as described above, this function does not use the printing function. Accordingly, there is no need to prohibit the function of scanning and handing-in in the exclusive usage mode. Thus, the custom menu 603 is left enabled also in the exclusive usage mode.

1.4 Operation of Registering Terminal

Figure 14:
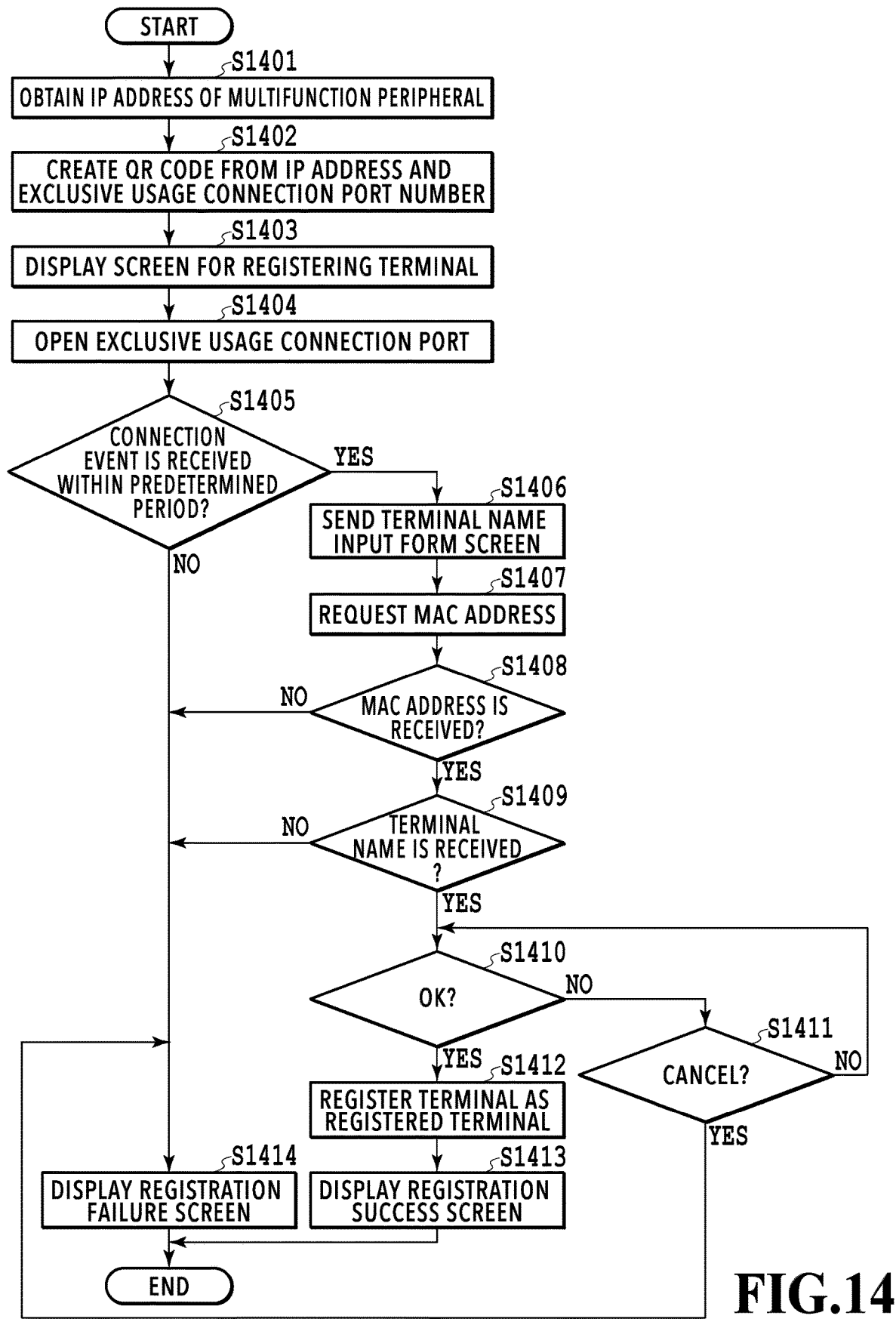
FIG. 14 is a flowchart illustrating operations of the multifunction peripheral in the case where the terminal is registered in the multifunction peripheral according to the embodiments.

A method for registering the terminal 103 in the multifunction peripheral 102 that is executed in the multifunction peripheral 102 is described with reference to FIG. 14. The CPU 201 of the multifunction peripheral 102 performs this method by reading and executing the program stored in the ROM 203.

First, in step S1401, the CPU 201 obtains the IP address of the multifunction peripheral 102. Note that, hereinafter, "step S" is abbreviated as "S".

Next, in S1402, the CPU 201 generates a QR code expressing the IP address obtained in S1401 and the exclusive usage connection port number, by encoding the IP address and the exclusive usage connection port number.

Then, in S1403, the CPU 201 displays the screen 1000 for terminal registration as illustrated in FIG. 10, on the operation panel. Since the description of the screen 1000 has been already given, description herein is omitted.

Next, in S1404, the CPU 201 opens the exclusive usage connection port.

Then, in S1405, in the case where the CPU 201 receives the connection request from the terminal 103 via the exclusive usage connection port within a predetermined period, the CPU 201 causes the processing to proceed to S1406, and continues communication with the terminal 103. If not, the CPU 201 causes the processing to proceed to S1414, and displays a registration failure screen on the operation panel. In this case, it is assumed that the user inputs the set of the IP address and the exclusive usage connection port number displayed in the screen 1000, in the address field of the WEB browser in the terminal 103. Alternatively, it is assumed that the user causes the terminal to read the QR code, and a decoded result of the QR code is thereby substituted into the address field of the WEB browser in the terminal.

In S1406, the CPU 201 sends the terminal name input form screen 1100 illustrated in FIG. 11, to the terminal 103. In this case, the IP address of the multifunction peripheral 102, the exclusive usage connection port number, and a program that operates in the terminal 103 to save the IP address and the port number in a predetermined region of the HDD 304 in the terminal 103 are embedded in the terminal name input form screen 1100. The printer driver can thereby obtain the IP address of the multifunction peripheral 102 and the exclusive usage connection port number. In this case, the exclusive usage connection port number displayed on the screen 1000 is set as the destination port number in the case where the terminal 103 sends the connection request received in S1405 to the multifunction peripheral 102. The exclusive usage connection port number used in reception of the print job by the multifunction peripheral 102 in the exclusive usage mode may be different from the aforementioned port number. Moreover, an exclusive connection port number used in establishment of the remote connection with the terminal 103 by the multifunction peripheral 102 in the exclusive usage mode may be different from the aforementioned port numbers. These numbers and a program that operates in the terminal 103 to save these numbers in a predetermined region of the HDD 304 in the terminal 103 are embedded in the terminal name input form screen 1100 as described above. The printer driver and a program for remote connection can thereby obtain these numbers. Note that these numbers are collectively referred to as exclusive usage connection port number in the description of the embodiments, even in the case where the numbers vary depending on the application.

Next, in S1407, the CPU 201 requests the MAC address of the terminal 103 from the terminal 103.

Then, in the case where the CPU 201 receives the MAC address within the predetermined period in S1408, the CPU 201 causes the processing to proceed to S1409, and continues the communication with the terminal 103. If not, the CPU 201 causes the processing to proceed to S1414, and displays the registration failure screen on the operation panel.

In S1409, in the case where the CPU 201 receives the name of the terminal within the predetermined period, the CPU 201 causes the processing to proceed to S1410. If not, the CPU 201 causes the processing to proceed to S1413, and displays the registration failure screen on the operation panel. In this case, it is assumed that the user inputs the name of the terminal into the text box 1101 of the terminal name input form screen 1100 displayed in the terminal 103, and presses an "OK" button 1102. The name of the terminal 103 inputted into the text box 1101 is thereby sent from the terminal 103 to the multifunction peripheral 102.

In the loop of S1410 and S1411, the CPU 201 waits for pressing of a "OK" button 1003 or a "cancel" button 1004 of the screen 1000 for terminal registration displayed on the operation panel.

In the case where the "OK" button 1003 is pressed, the CPU 201 determines YES in S1410, and causes the processing to proceed to S1412. In the case where the "cancel" button 1004 is pressed, the CPU 201 causes the processing to proceed to S1414, and displays the registration failure screen on the operation panel.

In S1412, the CPU 201 stores the set of the MAC address of the terminal 103 and the name of the terminal 103 in the non-volatile memory 218 to set the terminal 103 as the registered terminal. Alternatively, the CPU 201 may store the set of the MAC address of the terminal 103 and the name of the terminal 103 in an external storage apparatus referenceable by the multifunction peripheral 102.

Next, in S1413, the CPU 201 displays a registration success screen on the operation panel.

Note that, although not illustrated, the exclusive usage connection port opened in S1404 is closed, for example, at the time of execution of S1414 or S1413.

Figure 15:
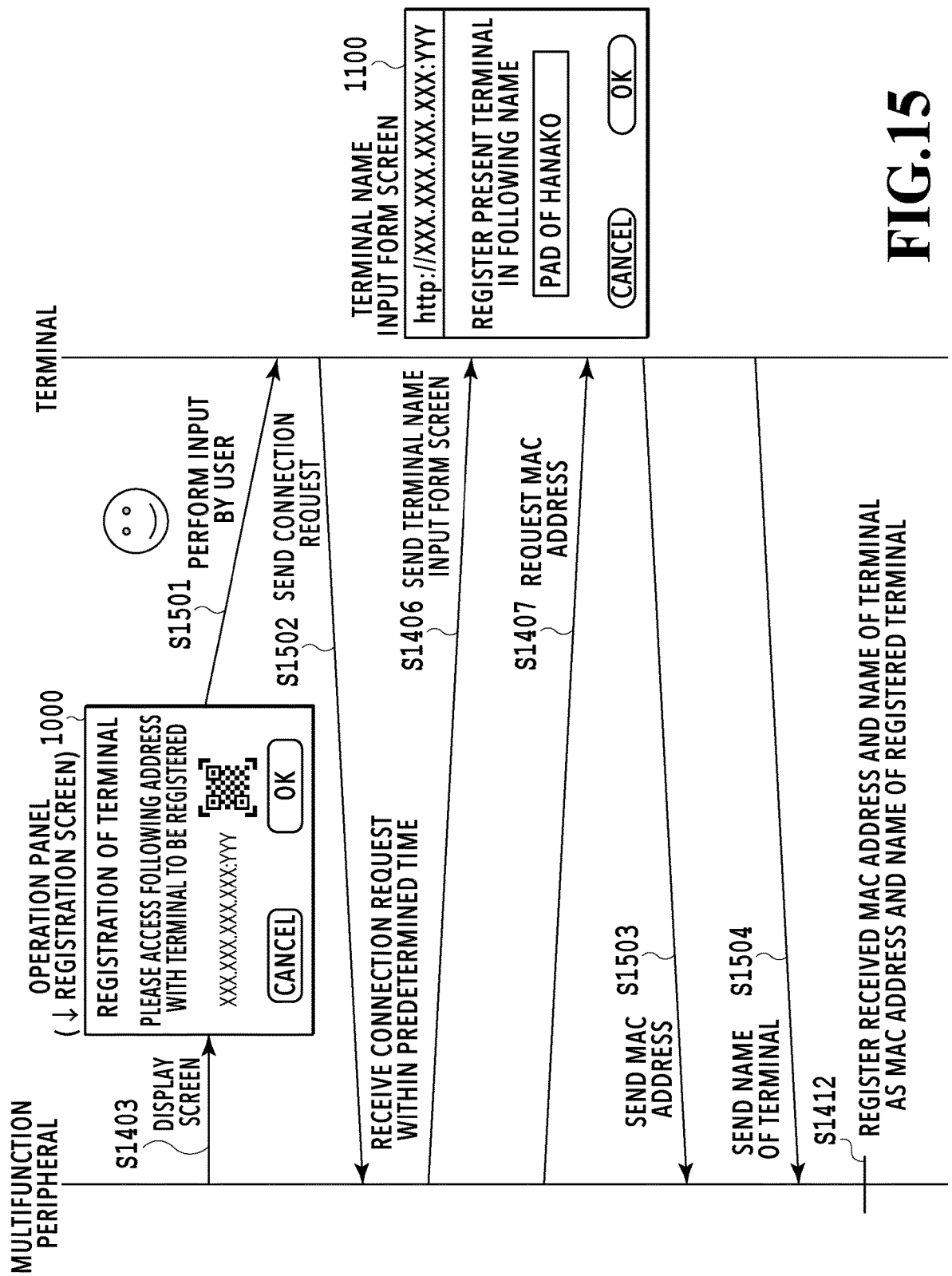
FIG. 15 is a sequence diagram illustrating a method of registering the terminal in the multifunction peripheral according to the embodiments.

Next, operations of the multifunction peripheral 102 and the terminal 103 in the case where the terminal 103 is registered in the multifunction peripheral 102 is described with reference to FIG. 15.

In S1403, the multifunction peripheral 102 displays the screen 1000 for terminal registration on the operation panel.

Next, in S1501, the user inputs the set of the IP address multifunction peripheral 102 and the exclusive usage connection port number into the address field of the browser in the terminal 103.

Then, in S1502, the terminal 103 sends the connection request to the multifunction peripheral 102 with the exclusive usage connection port being the destination port.

Next, in S1406, the multifunction peripheral 102 sends the terminal name input form screen 1100 to the terminal 103.

Then, in S1407, the multifunction peripheral 102 requests the MAC address of the terminal from the terminal 103.

Next, in S1503, the terminal 103 sends the MAC address of the terminal 103 to the multifunction peripheral 102.

Then, in S1504, the terminal 103 sends the name of the terminal 103 to the multifunction peripheral 102.

Next, in S1412, the multifunction peripheral 102 sets the terminal 103 as the registered terminal.

2 INDIVIDUAL EMBODIMENTS

Next, the following operations (A) to (C) according to the first to fourth embodiments are described.

The first embodiment corresponds to the case where the exclusive usage enabled period is started as described below.

The user switches the exclusive usage mode permit/prohibit switch 801 of the screen 800 (FIG. 8) from prohibit to permit on the operation panel of the multifunction peripheral 102 to start an exclusive usage permitted period, and then the terminal 103 is connected to the multifunction peripheral 102. Thereafter, the terminal 103 sends the exclusive usage start request to the multifunction peripheral 102 to start the exclusive usage enabled period.

The second embodiment corresponds to the case where the exclusive usage enabled period is started in the aforementioned order as in the first embodiment. Moreover, the second embodiment also corresponds to the case where the exclusive usage enabled period is started as follows. The terminal 103 is connected to the multifunction peripheral, and then the user switches the exclusive usage mode permit/prohibit switch 801 of the screen 800 (FIG. 8) from prohibit to permit on the operation panel of the multifunction peripheral 102 to start the exclusive usage permitted period. Thereafter, the terminal 103 sends the exclusive usage start request to the multifunction peripheral to start the exclusive usage enabled period.

The third embodiment is basically the same as the first embodiment. In the first embodiment, the multifunction peripheral 102 starts the exclusive usage enabled period in response to the exclusive usage start request, as long as the request is made within the exclusive usage permitted period. Meanwhile, in the third embodiment, the multifunction peripheral 102 starts the exclusive usage enabled period in response to the exclusive usage start request only within a predetermined period from the start of the exclusive usage permitted period.

The fourth embodiment is basically the same as the second embodiment. In the second embodiment, the multifunction peripheral 102 starts the exclusive usage enabled period in response to the exclusive usage start request, as long as the request is made within the exclusive usage permitted period. Meanwhile, in the fourth embodiment, the multifunction peripheral 102 starts the exclusive usage enabled period in response to the exclusive usage start request only within a predetermined period from the start of the exclusive usage permitted period.

The operations (A) to (C) are as follows.
(A) Operation of the multifunction peripheral 102 in the case where permit/prohibit of the exclusive usage mode is changed on the operation panel
(B) Operation of the multifunction peripheral 102 in the case where the terminal is connected or disconnected
(C) Operation of the multifunction peripheral 102 in the case where the multifunction peripheral 102 receives a request or a job from the terminal.

(A), (B), and (C) according to the first embodiment are described with reference to FIGS. 16, 17, and 18, respectively.

(A), (B), and (C) according to the second embodiment are described with reference to FIGS. 19, 17, and 18, respectively.

Figure 20:
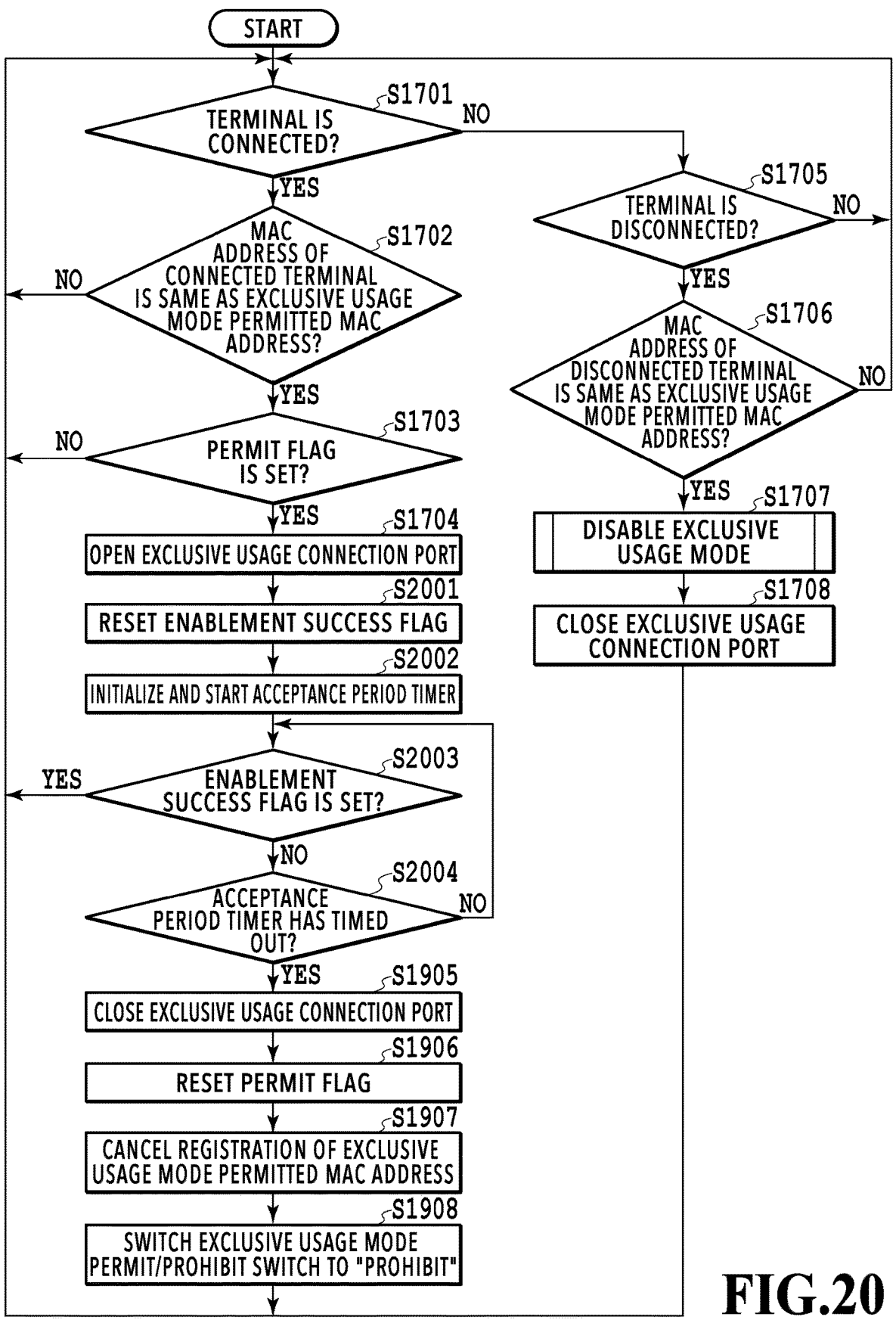
FIG. 20 is a flowchart illustrating operations of the multifunction peripheral in the case where the terminal is connected to the multifunction peripheral or is disconnected from the multifunction peripheral in the third and fourth embodiments.
Figure 21:
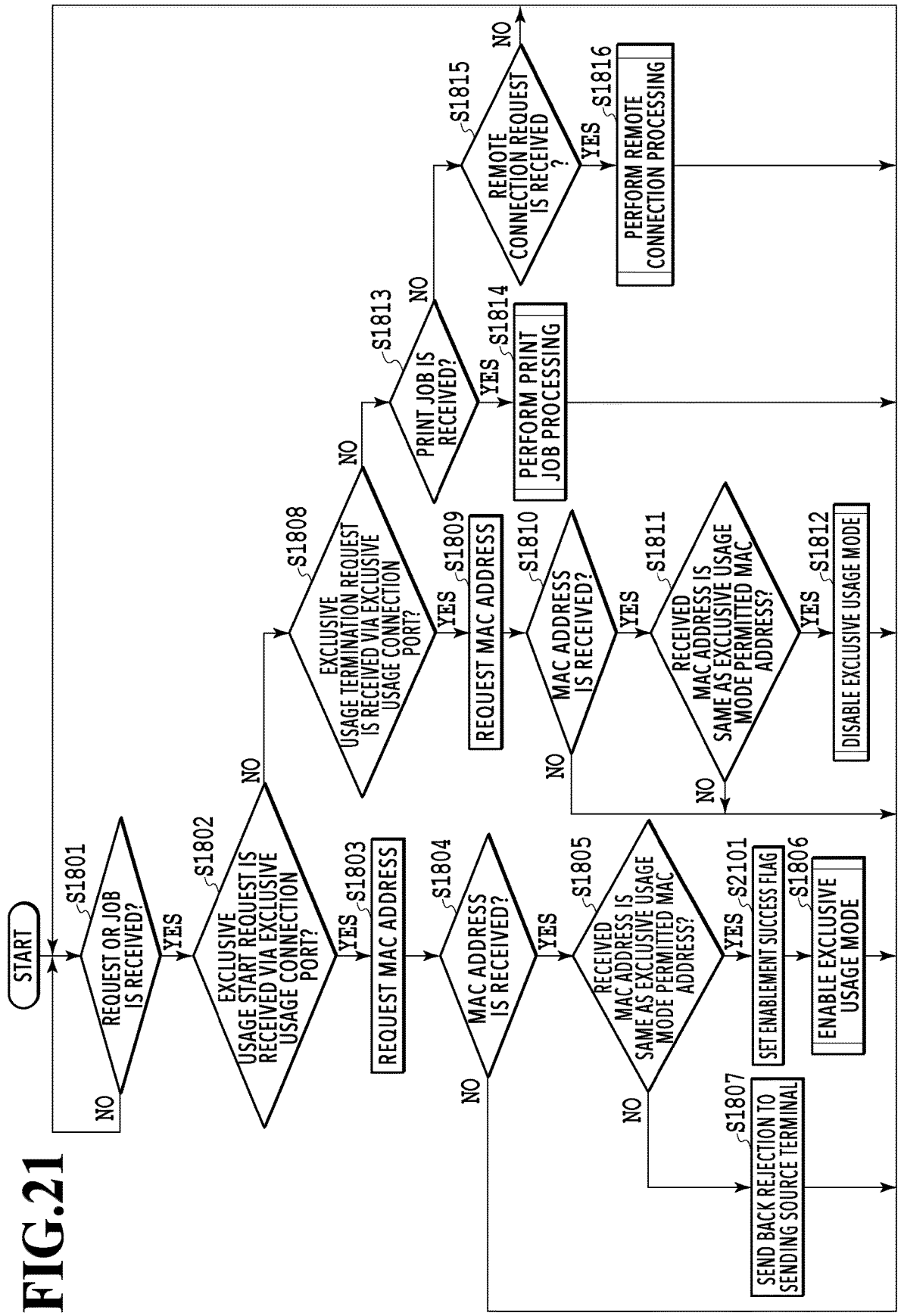
FIG. 21 is a flowchart illustrating operations of the multifunction peripheral in the case where the multifunction peripheral receives the request, the print job, or the remote connection request from the terminal in the third and fourth embodiments.

(A), (B), and (C) according to the third embodiment are described with reference to FIGS. 16, 20, and 21, respectively.

Figure 22:
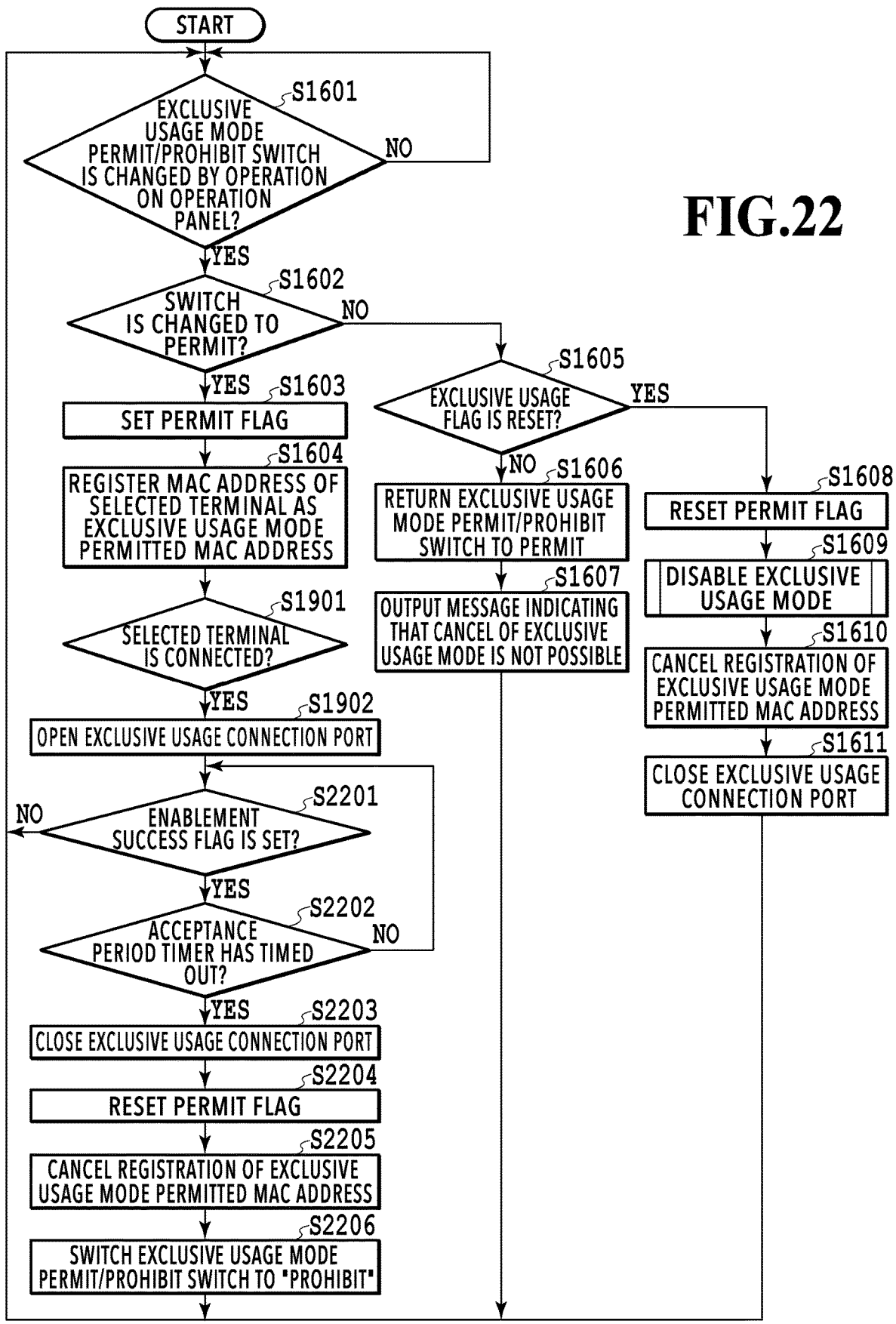
FIG. 22 is a flowchart illustrating operations of the multifunction peripheral in the case where an exclusive usage mode permit/prohibit switch in the screen illustrated in FIG. 8 is operated according to the fourth embodiment.

(A), (B), and (C) according to the fourth embodiment are described with reference to FIGS. 22, 20, and 21, respectively.

2.1 Operations of Multifunction Peripheral in Case where Permit/Prohibit of Exclusive Usage Mode is Changed on Operation Panel: First and Third Embodiments Description is given of the multifunction peripheral 102 according to the first and third embodiments in the case where permit/prohibit of the exclusive usage mode is changed by using the exclusive usage mode permit/prohibit switch 801 included in the screen 800 illustrated in FIG. 8.

Figure 16:
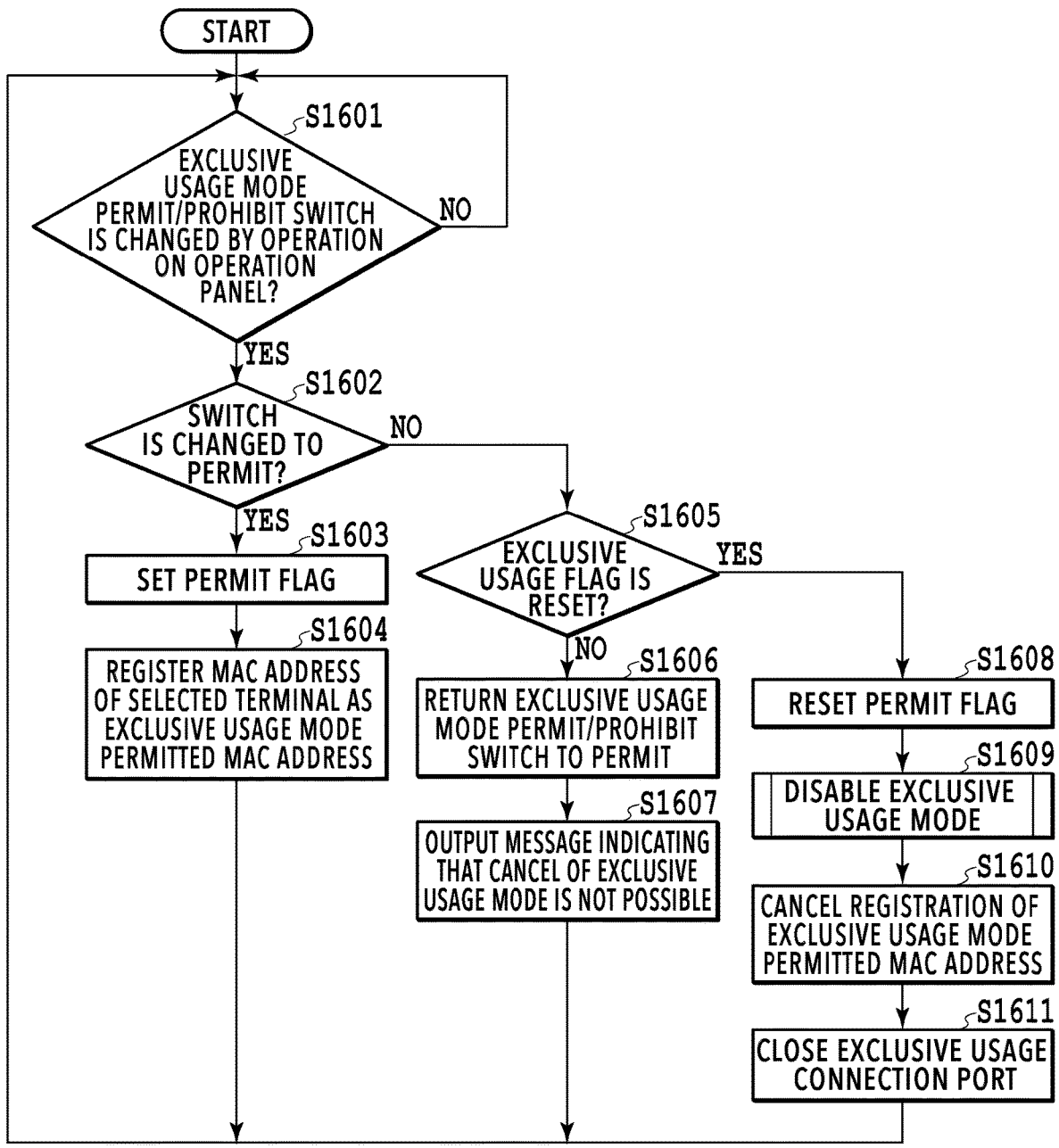
FIG. 16 is a flowchart illustrating operations of the multifunction peripheral in the case where an ON/OFF button in the screen illustrated in FIG. 8 is operated according to the first and third embodiments.

With reference to FIG. 16, in S1601, the CPU 201 waits until the setting position of the exclusive usage mode permit/prohibit switch 801 is changed (loop of NO in S1601).

In the case where the setting position of the exclusive usage mode permit/prohibit switch 801 is changed (YES in S1601), in S1602, the CPU 201 determines whether the exclusive usage mode permit/prohibit switch 801 is changed to the position of "permit".

In the case where the exclusive usage mode permit/prohibit switch 801 is changed to the position of "permit" (YES in S1602), in S1603, the CPU 201 sets a permit flag.

Next, in S1604, the CPU 201 registers the MAC address of the selected terminal as an exclusive usage mode permitted MAC address. In this case, the selected terminal is a terminal selected at the time of pressing of the "OK" button 904 in the screen 900 as illustrated in FIG. 9.

In the case where the exclusive usage mode permit/prohibit switch 801 is changed to the position of "prohibit" (NO in S1602), the CPU 201 causes the processing to proceed to S1605, and determines whether an exclusive usage flag is reset. The exclusive usage flag is a flag set in a period in which the exclusive usage terminal is exclusively using the printing function and the like of the multifunction peripheral 102 (that is the exclusive usage enabled period). The determination in S1605 is provided due to the following reason. Specifically, this is due to the reason that arbitrarily disabling the currently-enabled exclusive usage mode by switching the exclusive usage mode permit/prohibit switch 801 to "prohibit" is not preferable from the viewpoint of operation. For example, this is due to the reason that, in the case where a user A has enabled the exclusive usage mode with the terminal 103 set as the exclusive usage terminal, it is not preferable for a user B to disable the exclusive usage mode by switching the exclusive usage mode permit/prohibit switch 801 to "prohibit" from the viewpoint of operation. Note that the exclusive usage flag is reset in the case where the exclusive usage terminal sends the exclusive usage termination request to the multifunction peripheral 102, and the multifunction peripheral 102 terminates the exclusive usage enabled period in response to the request.

Accordingly, in the case where the exclusive usage flag is not reset (NO in S1605), the CPU 201 causes the processing to proceed to S1606, and returns the exclusive usage mode permit/prohibit switch 801 to "permit". Moreover, in 51607, the CPU 201 displays the screen 1301 as illustrated in FIG. 13 as a superimposed screen.

Meanwhile, in the case where the exclusive usage flag is reset (YES in S1605), the CPU 201 causes the processing to proceed to S1608, and resets the permit flag. Next, in S1609, the CPU 201 disables the exclusive usage mode. However, although not illustrated, in the case where the disablement of the exclusive usage mode is already executed in S1707 (FIG. 17) or S1812 (FIG. 18), S1609 does not have to be executed. Details of disablement processing are described later with reference to FIG. 19. Next, in S1610, the CPU 201 cancels the registration of the exclusive usage mode permitted MAC address. Next, in S1611, the CPU 201 closes the exclusive usage connection port.

The aforementioned operation allows the permit flag to be set only in the period in which the exclusive usage mode permit/prohibit switch 801 is at the position of "permit".

2.2 Operations of Multifunction Peripheral in Case where Terminal is Connected or Disconnected: First and Second Embodiments Description is given of the operations of the multifunction peripheral 102 in the first and second embodiments in the case where the terminal 103 is connected to the multifunction peripheral 102 or is disconnected from the multifunction peripheral 102.

Figure 17:
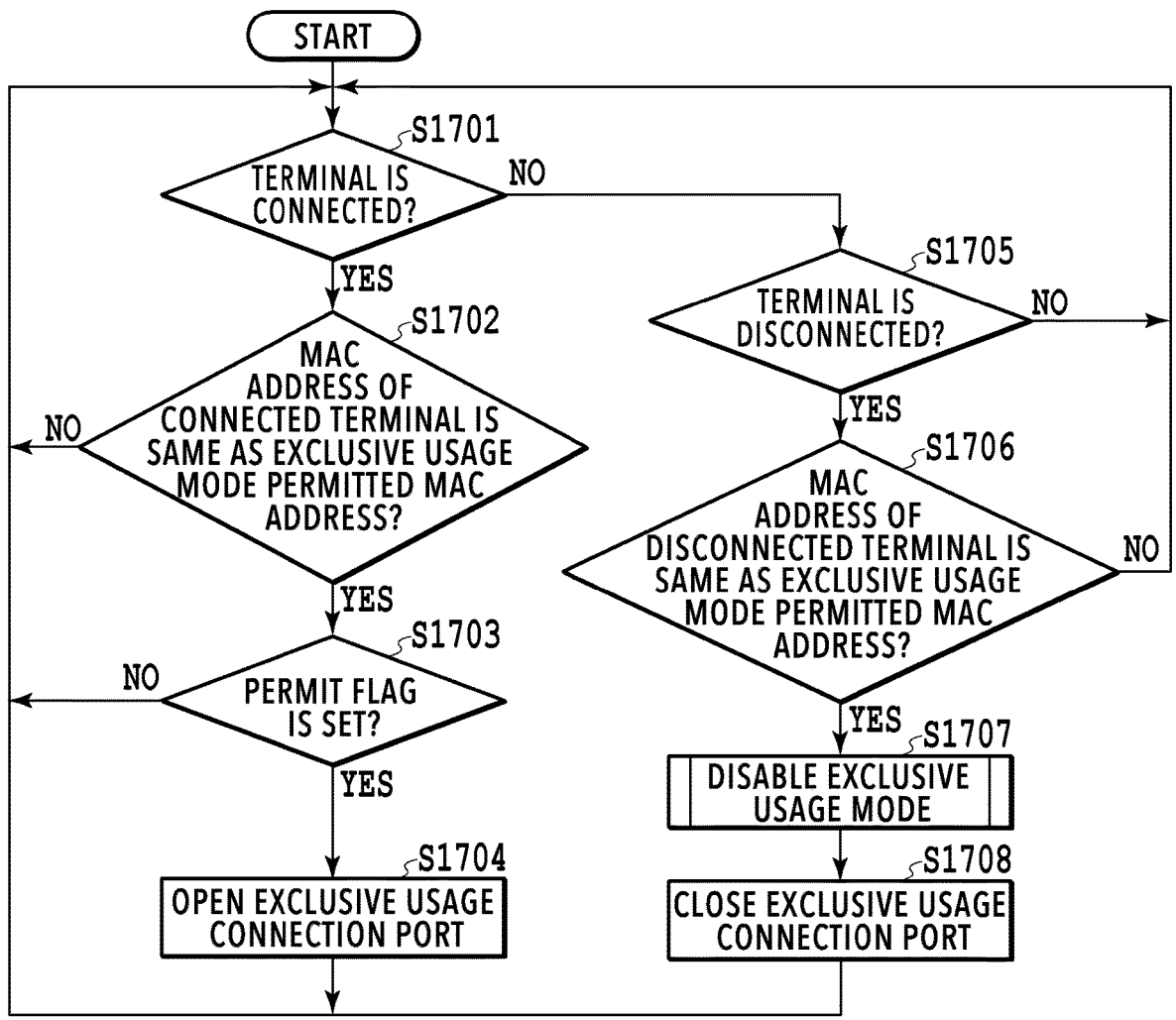
FIG. 17 is a flowchart illustrating operations of the multifunction peripheral in the case where the terminal is connected to the multifunction peripheral or is disconnected from the multifunction peripheral in the first and second embodiments.

With reference to FIG. 17, in the loop of S1701 and S1705, the CPU 201 waits until any terminal is connected to the multifunction peripheral 102 via the network 101 or is disconnected from the multifunction peripheral 102.

In the case where any terminal is connected to the multifunction peripheral 102 via the network 101 (YES in S1701), in S1702, the CPU 201 determines whether the MAC address of the connected terminal is the same as the exclusive usage mode permitted MAC address. Specifically, in S1702, the CPU 201 determines whether the connected terminal is the permitted terminal. In the case where the MAC address of the connected terminal is the same as the exclusive usage mode permitted MAC address (that is, in the case where the connected terminal is the permitted terminal) (YES in S1702), the CPU 201 causes the processing to proceed to S1703. If not (NO in S1702), the CPU 201 causes the processing to return to the loop of S1701 and S1705.

In S1703, the CPU 201 determines whether the permit flag is already set. In the case where the permit flag is set, the CPU 201 causes the processing to proceed to S1704, and opens the exclusive usage connection port. If not (NO in S1703), the CPU 201 causes the processing to return to the loop of S1701 and S1705.

In the case where any terminal is disconnected from the multifunction peripheral 102 (YES in S1705), in S1706, the CPU 201 determines whether the MAC address of the disconnected terminal is the same as the exclusive usage mode permitted MAC address. Specifically, in S1706, the CPU 201 determines whether the disconnected terminal is any of the permitted terminal and the exclusive usage terminal. In the case where the MAC address of the disconnected terminal is the same as the exclusive usage mode permitted MAC address (that is, in the case where the disconnected terminal is any of the selected terminal and the exclusive usage terminal) (YES in S1706), the CPU 201 causes the processing to proceed to S1707. If not (NO in S1706), the CPU 201 causes the processing to return to the loop of S1701 and S1705.

In S1707, the CPU 201 disables the exclusive usage mode. However, although not illustrated, in the case where the disablement of the exclusive usage mode is already executed in S1812 (FIG. 18), S1707 does not have to be executed. Details of processing of disabling the exclusive usage mode are described later.

Next, in S1708, the CPU 201 closes the exclusive usage connection port.

In this case, as described above, the permit flag is set only in the exclusive usage permitted period in which the exclusive usage mode permit/prohibit switch 801 is at the position of "permit".

Accordingly, in the case where the permitted terminal is connected to the multifunction peripheral 102 in the exclusive usage permitted period in which the exclusive usage mode permit/prohibit switch 801 is at the position of "permit", the exclusive usage connection port is opened. Moreover, in the case where the permitted terminal is disconnected from the multifunction peripheral 102 in the exclusive usage permitted period, the exclusive usage connection port is closed. Furthermore, in the case where a terminal other than the permitted terminal is connected to the multifunction peripheral 102 in the exclusive usage permitted period, the exclusive usage connection port is not changed from closed to open. Moreover, in the case where a terminal that is not the permitted terminal or the exclusive usage terminal is disconnected from the multifunction peripheral 102 in the exclusive usage permitted period, the exclusive usage connection port is not changed from open to closed.

Particularly, in the case where the registered terminal other than the permitted terminal is connected to the multifunction peripheral 102 or is disconnected from the multifunction peripheral in the exclusive usage permitted period, the open/closed of the exclusive usage connection port is not changed.

Focusing on a specific registered terminal, in the case where the exclusive usage mode permit/prohibit switch 801 is switched to permit while this registered terminal is the selected terminal, the exclusive usage permitted period is started, and this terminal is set as the permitted terminal. In the case where this terminal is connected to the multifunction peripheral 102 in the exclusive usage permitted period, the exclusive usage connection port is opened. Then, as described in detail later, in the case where this terminal sends the exclusive usage start request to the multifunction peripheral 102, the exclusive usage mode is enabled, and this terminal is set as the exclusive usage terminal.

2.3 Operations of Multifunction Peripheral in Case where Multifunction Peripheral Receives Request or Job from Terminal: First and Second Embodiments Description is given of operations of the multifunction peripheral 102 in the first and second embodiments in the case where the multifunction peripheral 102 receives a request or a job from the terminal.

Figure 18:
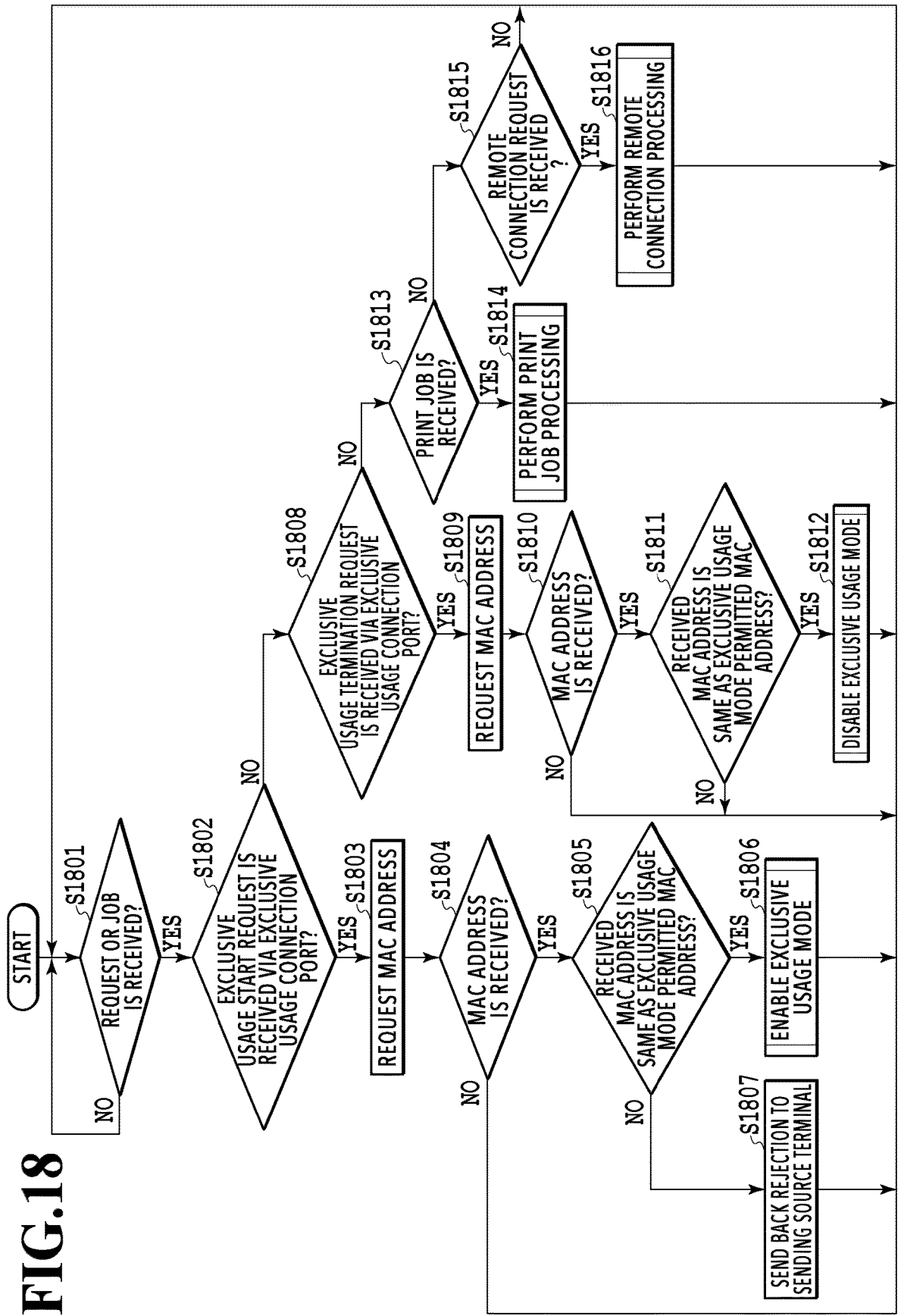
FIG. 18 is a flowchart illustrating operations of the multifunction peripheral in the case where the multifunction peripheral receives a request, a print job, or a remote connection request from the terminal in the first and second embodiments.
Figure 19:
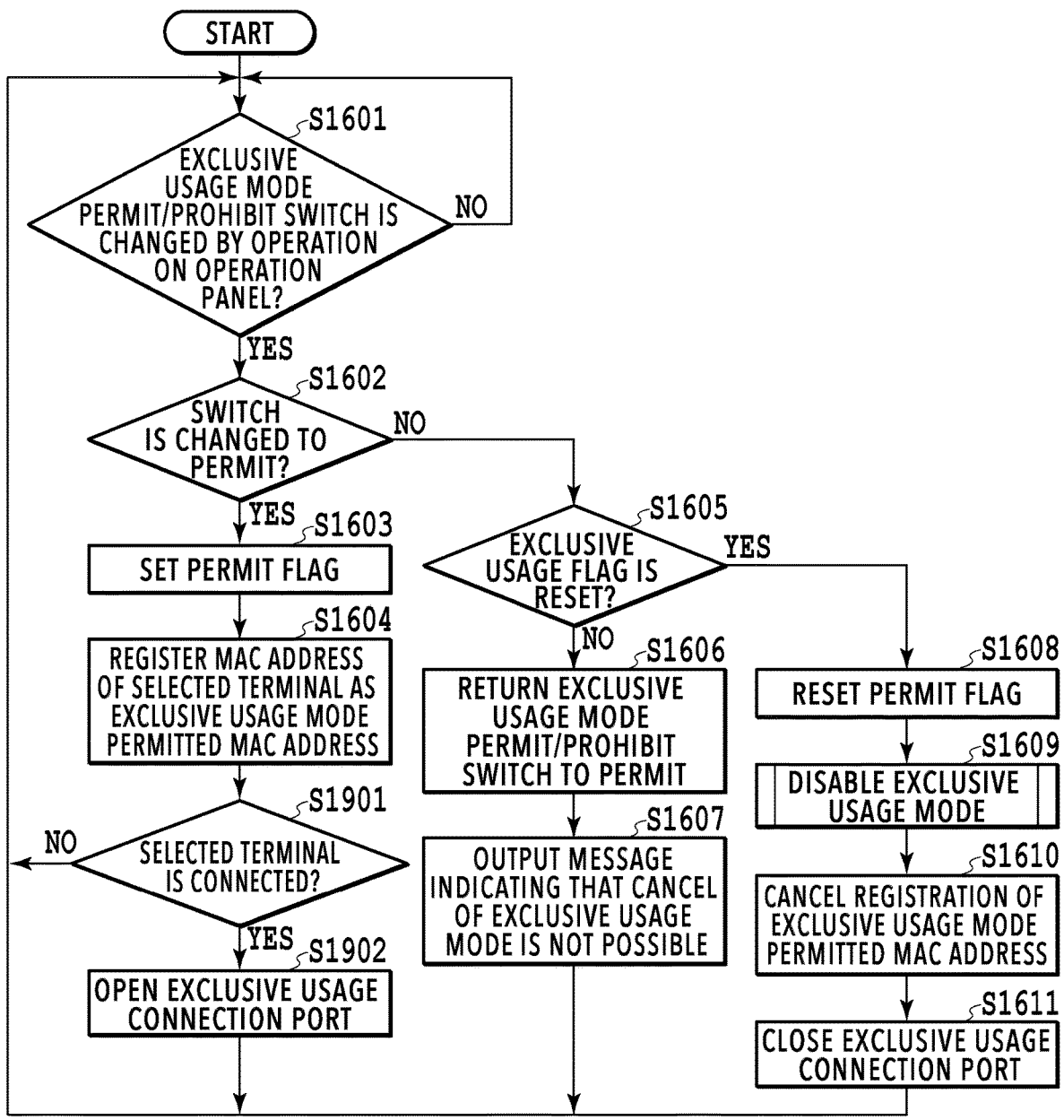
FIG. 19 is a flowchart illustrating operations of the multifunction peripheral in the case where the ON/OFF button in the screen illustrated in FIG. 8 is operated according to the second embodiment.

With reference to FIG. 18, in the loop of NO in S1801, the CPU 201 waits for a request or a job from any terminal X.

In the case where the CPU 201 receives a request or a job from any terminal X (YES in S1801), in S1802, the CPU 201 determines whether the CPU 201 has received the exclusive usage start request via the exclusive usage connection port. Moreover, in S1808, the CPU 201 determines whether the CPU 201 has received the exclusive usage termination request via the exclusive usage connection port. Furthermore, in S1813, the CPU 201 determines whether the CPU 201 has received the print job. Moreover, in S1815, the CPU 201 determines whether the CPU 201 has received the remote connection request.

In the case where the CPU 201 has received the exclusive usage start request from any terminal X via the exclusive usage connection port (YES in S1801, YES in S1802), the CPU 201 causes the processing to proceed to S1803, and requests the MAC address of the terminal X from the terminal X.

Next, in the case where the CPU 201 receives the MAC address of the terminal X from the terminal X within a predetermined period (YES in S1804), the CPU 201 causes the processing to proceed to S1805. If not, the CPU 201 causes the processing to return to S1801.

In S1805, the CPU 201 determines whether the received MAC address is the same as the exclusive usage mode permitted MAC address. If so (YES in S1805), the CPU 201 causes the processing proceed to S1806, and enables the exclusive usage mode. If not (NO in S1805), the CPU 201 causes the processing to proceed to S1807, and sends back rejection to the terminal X. After completion of S1807, the CPU 201 causes the processing to return to S1801.

Accordingly, the exclusive usage mode is enabled only in the case where the exclusive usage start request is sent from a terminal whose MAC address is set as the exclusive usage mode permitted MAC address in the multifunction peripheral 102 with the exclusive usage connection port being the destination port.

In the case where the CPU 201 has received the exclusive usage termination request from any terminal X via the exclusive usage connection port (YES in S1801, NO in S1802, YES in S1808), the CPU 201 causes the processing to proceed to S1809, and requests the MAC address of the terminal X from the terminal X.

Next, in the case where the CPU 201 receives the MAC address from the terminal X within a predetermined period (YES in S1810), the CPU 201 causes the processing to proceed to S1811. If not, the CPU 201 causes the processing to return to S1801.

In S1811, the CPU 201 determines whether the received MAC address is the same as the exclusive usage mode permitted MAC address. If so (YES in S1811), the CPU 201 causes the processing to proceed to S1812, and disables the exclusive usage mode. If not (NO in S1811), the CPU 201 causes the processing to return to S1801.

Accordingly, the exclusive usage mode is disabled only in the case where the exclusive usage termination request is sent from a terminal whose MAC address is set as the exclusive usage mode permitted MAC address in the multifunction peripheral 102 with the exclusive usage connection port being the destination port.

In the case where the CPU 201 has received the print job from any terminal X via any port (YES in S1801, NO in S1802 and S1808, YES in S1813), the CPU 201 causes the processing to proceed to S1814, and executes print job processing. After completion of the print job processing in S1814, the CPU 201 causes the processing to return to S1801. Details of the print job processing are described later.

In the case where the CPU 201 has received the remote connection request from any terminal X via any port (YES in S1801, NO in S1802, S1808, and S1813, YES in S1815), the CPU 201 causes the processing to proceed to S1816, and executes remote connection processing. After completion of the remote connection processing in S1816, the CPU 201 causes the processing to return to S1810. Details of the remote connection processing are described later.

2.4 Operations of Multifunction Peripheral in Case where Permit/Prohibit of Exclusive Usage Mode is Changed on Operation Panel: Second Embodiment In the first embodiment, the exclusive usage connection port is opened in the case where the exclusive usage mode permit/prohibit switch 801 is switched to "permit" to start the exclusive usage permitted period and then the terminal 103 set as the permitted terminal is connected to the multifunction peripheral 102. Then, the exclusive usage mode is enabled in the case where the terminal 103 set as the permitted terminal sends the exclusive usage start request to the multifunction peripheral 102, and the terminal 103 is set as the exclusive usage terminal.

Accordingly, in the case where the terminal 103 is connected to the multifunction peripheral 102 before the switching of the exclusive usage mode permit/prohibit switch 801 to "permit", there is no opportunity of opening the exclusive usage connection port.

The second embodiment solves this problem. In the case where the terminal 103 is already connected to the multifunction peripheral 102 at the time of switching of the exclusive usage mode permit/prohibit switch 801 to "permit", the exclusive usage connection port is opened.

The operations of the multifunction peripheral 102 in the first and third embodiments are already described with reference to FIG. 16. The operations of the multifunction peripheral 102 in the second embodiment are as illustrated in FIG. 19.

Steps in common with the steps in the first embodiment among steps included in the operations of the multifunction peripheral 102 in the second embodiment are denoted by the same reference numerals as those in the first embodiment, and overlapping description of these steps is omitted.

The operations of the multifunction peripheral 102 in the second embodiment are different from the operations of the multifunction peripheral 102 in the first embodiment in following points. Specifically, in the first embodiment, as illustrated in FIG. 16, the CPU 201 causes the processing to proceed to the loop of S1601 after the execution of S1604. Meanwhile, in the second embodiment, as illustrated in FIG. 19, the CPU 201 causes the processing to proceed to S1901 after the execution of S1604, and determines whether the selected terminal 103 is connected to the multifunction peripheral 102. In the case where the selected terminal is connected to the multifunction peripheral 102, the CPU 201 causes the processing to proceed to S1902, and opens the exclusive usage connection port. In the case of NO in S1901, the CPU 201 causes the processing to return to the loop of S1601. Moreover, in the case of YES in S1901, the CPU 201 executes S1902, and then causes the processing to return to the loop of S1601. Note that the determination of S1901 is performed by checking whether the MAC address of any of connected terminals matches the exclusive usage mode permitted MAC address.

2.5 Operations of Multifunction Peripheral in Case where Terminal is Connected or Disconnected: Third and Fourth Embodiments Description is given of operations of the multifunction peripheral 102 in the third and fourth embodiments in the case where the terminal 103 is connected to the multifunction peripheral 102 or is disconnected from the multifunction peripheral 102.

In the first embodiment, the exclusive usage mode is enabled at any time in the period in which the terminal 103 is connected to the multifunction peripheral 102 in the case where the terminal 103 set as the permitted terminal sends the exclusive usage start request to the multifunction peripheral 102. Accordingly, a halfway state in which the terminal 103 set as the permitted terminal is connected to the multifunction peripheral 102 but the enabling of the exclusive usage mode is not started may continue for a long period.

In the third and fourth embodiments, initializing processing is executed in the case a predetermined acceptance period elapses from connection of the terminal 103 to the multifunction peripheral 102 but no exclusive usage start request is sent from the terminal 103 to the multifunction peripheral 102. The initializing processing includes closing the exclusive usage connection port, switching the exclusive usage mode permit/prohibit switch 801 to "prohibit", and processing relating to the closing and switching.

This can eliminate a possibility that the halfway state in which the terminal 103 set as the permitted terminal is connected to the multifunction peripheral 102 but the enabling of the exclusive usage mode is not started continues for a long period.

The operations of the multifunction peripheral 102 in the case where the terminal is connected or disconnected in the first and second embodiments are already described with reference to FIG. 17. Operations of the multifunction peripheral 102 in the case where the terminal is connected or disconnected in the third and fourth embodiments are as illustrated in FIG. 20.

Steps in common with the steps in the first and second embodiments among steps included in the operations of the multifunction peripheral 102 in the third and fourth embodiments are denoted by the same reference numerals as those in the first and second embodiments, and overlapping description of these steps is omitted.

The operations of the multifunction peripheral 102 in the third and fourth embodiments are different from the operations of the multifunction peripheral 102 in the first and second embodiments in the following points. Specifically, in the first and second embodiments, as illustrated in FIG. 17, after completion of the execution of S1704, the CPU 201 causes the processing to return to the loop of S1701 and S1705. Meanwhile, in the third and fourth embodiments, as illustrated in FIG. 20, after completion of the execution of S1704, the CPU 201 causes the processing to proceed to S2001.

In S2001, the CPU 201 resets an enablement success flag. The enablement success flag is set after this step in the case where the exclusive usage mode is successfully enabled in an acceptance period to be described later. This is described later with reference to FIG. 21.

Next, in S2002, the CPU 201 initializes an acceptance period timer to a predetermined value, and starts the acceptance period timer. The acceptance period timer corresponds to the acceptance period in which the CPU 201 accepts the exclusive usage start request from the connection of the terminal to the multifunction peripheral.

Then, in the case where the enablement success flag is set before time-out of the acceptance period timer (NO in S2004, YES in S2003), the CPU 201 causes the processing to return to the loop of S1701 and 1705.

Meanwhile, in the case where the acceptance period timer times out before the setting of the enablement success flag (NO in S2003, YES in S2004), the CPU 201 causes the processing proceed to S1905, and closes the exclusive usage connection port.

Next, the CPU 201 resets the permit flag in S1906, cancels the registration of the exclusive usage mode permitted MAC address in S1907, switches the exclusive usage mode permit/prohibit switch 801 to "prohibit" in S1908, and then causes the processing to return to the loop of S1701 and S1705.

This can eliminate the possibility that the halfway state in which the terminal 103 set as the permitted terminal is connected to the multifunction peripheral 102 but the enabling of the exclusive usage mode does not start continues for a long period.

This causes the exclusive usage connection port to be closed if the state where the terminal 103 set as the permitted terminal is connected to the multifunction peripheral 102 but the exclusive usage mode is not enabled continues for the acceptance period. Moreover, the exclusive usage mode permit/prohibit switch 801 is returned to the position of "prohibit".

2.6 Operations of Multifunction Peripheral in Case where Multifunction Peripheral Receives Request or Job from Terminal: Third and Fourth Embodiments Operations of the multifunction peripheral 102 in the case where the multifunction peripheral 102 receives a request or a job from the terminal in the third and fourth embodiments include a portion supplementing the operations of the multifunction peripheral 102 in the case where the multifunction peripheral 102 receives a request or a job from the terminal in the first and second embodiments.

The operations of the multifunction peripheral 102 in the first and second embodiments are already described with reference to FIG. 18. The operations of the multifunction peripheral 102 in the third and fourth embodiments are as illustrated in FIG. 21.

Steps in common with the steps in the first and second embodiments among steps included in the operations of the multifunction peripheral 102 in the third and fourth embodiments are denoted by the same reference numerals as those in the first and second embodiments, and overlapping description of these steps is omitted.

The operations of the multifunction peripheral 102 in the third and fourth embodiments are different from the operations of the multifunction peripheral 102 in the first and second embodiments in the following points. Specifically, in the first and second embodiments, as illustrated in FIG. 18, in the case where determination of YES is made in S1805, the CPU 201 causes the processing to proceed to S1806, and enables the exclusive usage mode. Meanwhile, in the third and fourth embodiments, as illustrated in FIG. 21, in the case where determination of YES is made in S1805, the CPU 201 causes the processing to proceed to S2101, sets an enablement success flag, then causes the processing to proceed to S1806, and enables the exclusive usage mode.

Note that, in the case where the enablement success flag is not set within the acceptance period, S1905 is executed and the exclusive usage connection port is closed. Accordingly, determination of YES is not made in S1802. Thus, the exclusive usage mode can be enabled only in the case where the multifunction peripheral 102 receives the exclusive usage start request from the terminal 103 within the acceptance period.

2.7 Operations in Case where Permit/Prohibit of Exclusive Usage Mode is Changed on Operation Panel: Fourth Embodiment In the fourth embodiment, as in the second embodiment, the exclusive usage connection port is opened in the case where the terminal 103 is already connected to the multifunction peripheral 102 at the time of switching of the exclusive usage mode permit/prohibit switch 801 to "permit".

In the second embodiment, then, a halfway state in which the terminal 103 does not send the exclusive usage start request to the multifunction peripheral 102 may continue for a long period. The fourth embodiment solves this problem, and initializing processing is executed in the case where a predetermined acceptance period elapses from the opening of the exclusive usage connection port but no exclusive usage start request is sent from the terminal 103 to the multifunction peripheral 102.

The initializing processing includes closing the exclusive usage connection port, switching the exclusive usage mode permit/prohibit switch 801 to "prohibit", and processing relating to the closing and the switching.

The operations of the multifunction peripheral 102 in the second embodiment are already described with reference to FIG. 19. The operations of the multifunction peripheral 102 in the fourth embodiment are as illustrated in FIG. 22.

Steps in common with the steps in the second embodiment among steps included in the operations of the multifunction peripheral 102 in the fourth embodiment are denoted by the same reference numerals as those in the second embodiment, and overlapping description of these steps is omitted.

The operations of the multifunction peripheral 102 in the fourth embodiment are different from the operations of the multifunction peripheral 102 in the second embodiment in the following points. Specifically, in the second embodiment, as illustrated in FIG. 19, after the execution of S1902, the CPU 201 causes the processing to return to the loop of S1601. Meanwhile, in the fourth embodiment, after the execution of S1902, the CPU 201 causes the processing to proceed to a loop of S2201 and S2202.

In the case where the enablement success flag is set before the time out of the acceptance period timer (NO in S2202, YES in S2201), the CPU 201 causes the processing to return to the loop of S1601.

Meanwhile, in the case where the acceptance period timer times out before the setting of the enablement success flag (NO in S2201, YES in S2202), the CPU 201 causes the processing to proceed to S2203, and closes the exclusive usage connection port.

Next, the CPU 201 resets the permit flag in S2204, cancels the registration of the exclusive usage mode permitted MAC address in S2205, switches the exclusive usage mode permit/prohibit switch 801 to "prohibit" in S2206, and then causes the processing to return to S1601.

3 COMMON EMBODIMENT

Next, processing of enabling the exclusive usage mode (S1806 (FIG. 18)) and processing of disabling the exclusive usage mode (S1606 (FIG. 16), S1707 (FIG. 17), or S1812 (FIG. 18)) in the first to fourth embodiments are described.

Figure 23A:
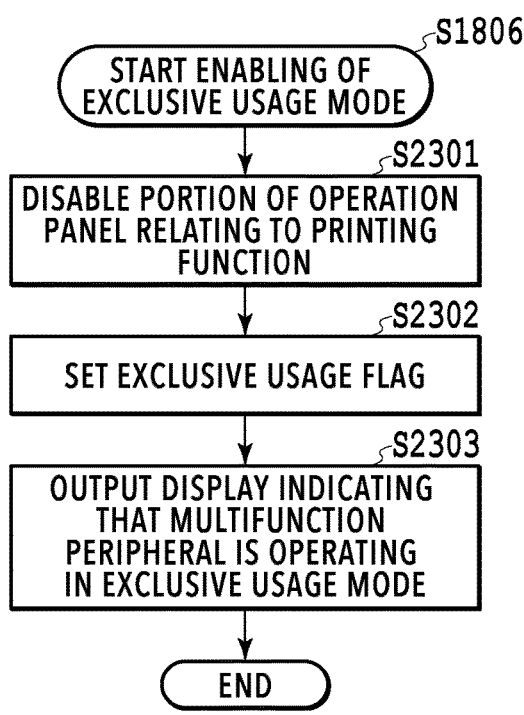
FIG. 23A is a flowchart illustrating operations of the multifunction peripheral in the case where the exclusive usage mode is enabled.
Figure 23B:
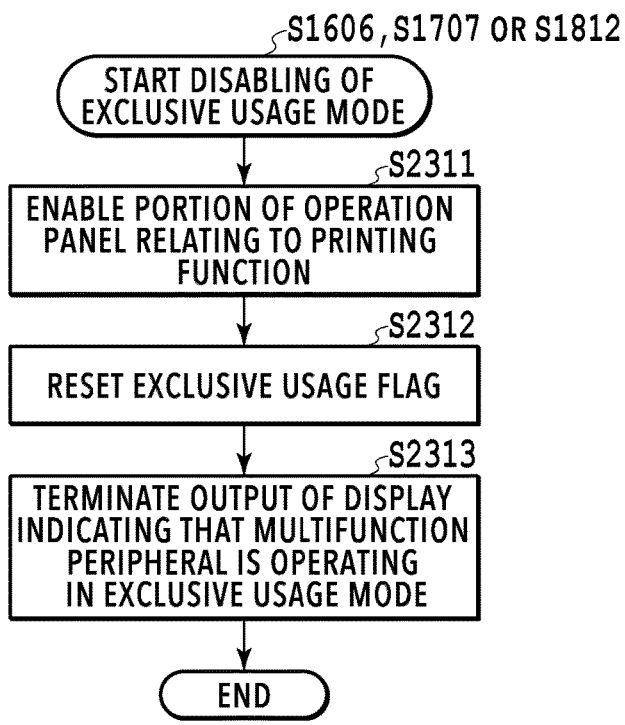
FIG. 23B is a flowchart illustrating operations of the multifunction peripheral in the case where the exclusive usage mode is disabled.

With reference to FIG. 23, in the processing of enabling the exclusive usage mode, first, in S2301, the CPU 201 disables a portion of the operation panel relating to the printing function and the like. Next, in S2302, the CPU 201 sets the exclusive usage flag. Then, in S2303, the CPU 201 outputs a display indicating that the multifunction peripheral is operating in the exclusive usage mode. In this case, the display indicating that the multifunction peripheral is operating in the exclusive usage mode may be, for example, a specific display on a display panel or light emission of a specific color in a light emitter.

Moreover, in the processing of disabling the exclusive usage mode, first, in S2311, the CPU 201 enables the portion of the operation panel relating to the printing function and the like. Next, in S2312, the CPU 201 resets the exclusive usage flag. Then, in S2313, the CPU 201 terminates the output of the display indicating that the multifunction peripheral is operating in the exclusive usage mode.

Next, the print job processing (S1814) in the first to fourth embodiments is described.

Figure 24:
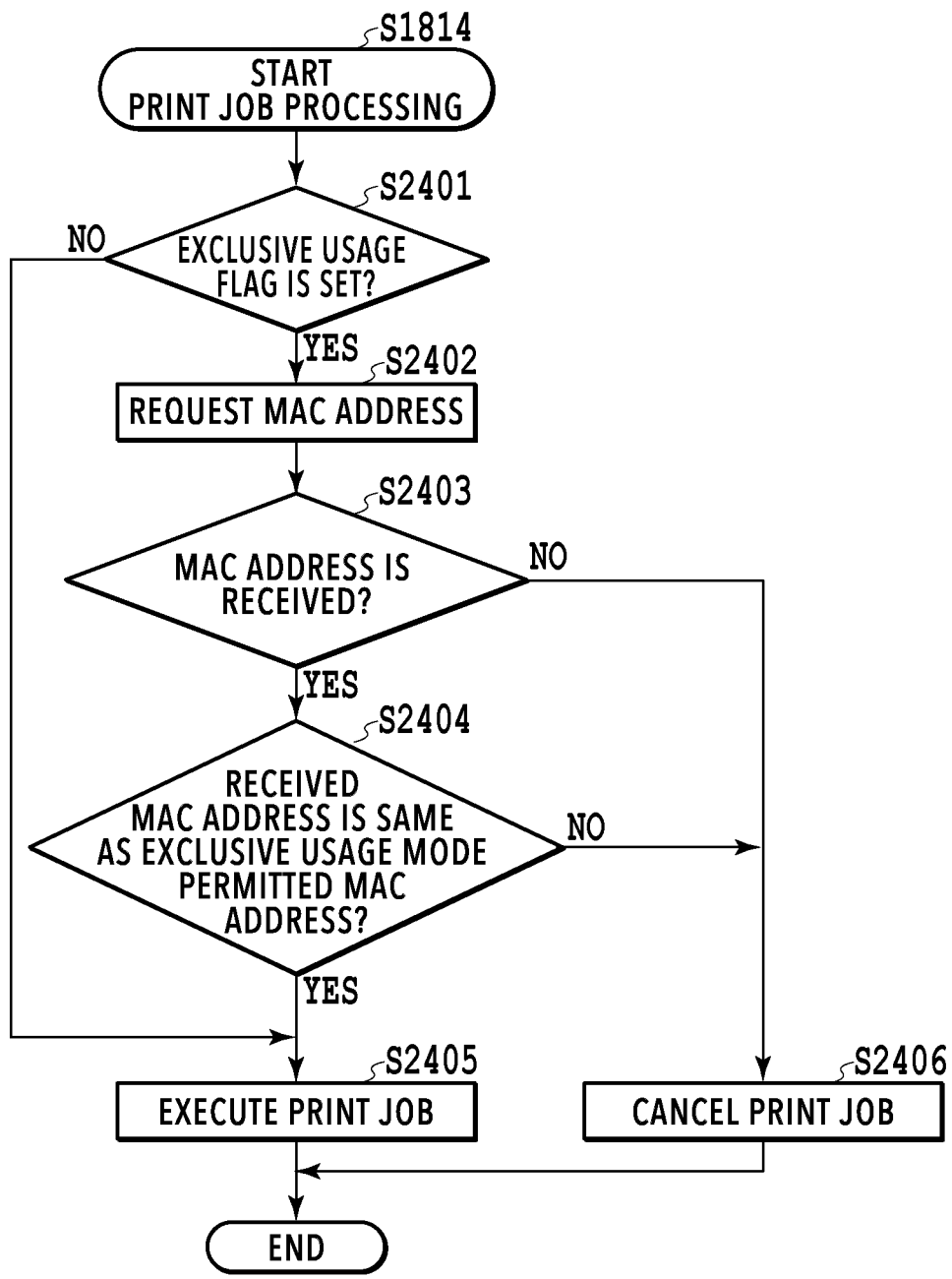
FIG. 24 is a flowchart illustrating print job processing of the multifunction peripheral according to the first to fourth embodiments.

With reference to FIG. 24, in the print job processing, first, in S2401, the CPU 201 determines whether the exclusive usage flag is set.

In the case where the exclusive usage flag is not set (NO in S2401), the CPU 201 causes the processing to proceed to S2405, and executes the print job.

In the case where the exclusive usage flag is set (YES in S2401), the CPU 201 causes the processing to proceed to S2402, and requests the MAC address from the terminal 103.

Next, the CPU 201 causes the processing to proceed to S2405 in the case where the CPU 201 can receive the MAC address from the terminal 103 within a predetermined period (YES in S2403) and the received MAC address is the exclusive usage mode permitted MAC address (YES in S2404). Then, the CPU 201 executes the print job in S2405.

Meanwhile, in the case where the CPU 201 cannot receive the MAC address from the terminal 103 within the predetermined period (NO in S2403), the CPU 201 causes the processing to proceed to S2406, and cancels the print job. Moreover, in the case where the CPU 201 can receive the MAC address from the terminal 103 within the predetermined period (YES in S2403) but the received MAC address is not the exclusive usage mode permitted MAC address (NO in S2404), the CPU 201 causes the processing to proceed in S2406. Then, the CPU 201 cancels the print job in S2406.

Note that the multifunction peripheral 102 may close a normal port simultaneously with the opening of the exclusive usage connection port in the exclusive usage mode. Then, the printer driver of the terminal 103 sends the print job to the multifunction peripheral 102 with the exclusive usage connection port being the destination port in the exclusive usage mode. Other terminals send print jobs to the multifunction peripheral 102 with the normal port being the destination port. However, since the normal port is closed, these print jobs are discarded in the multifunction peripheral 102.

Next, the remote connection processing (S1816) in the first to fourth embodiments are described.

Figure 25:
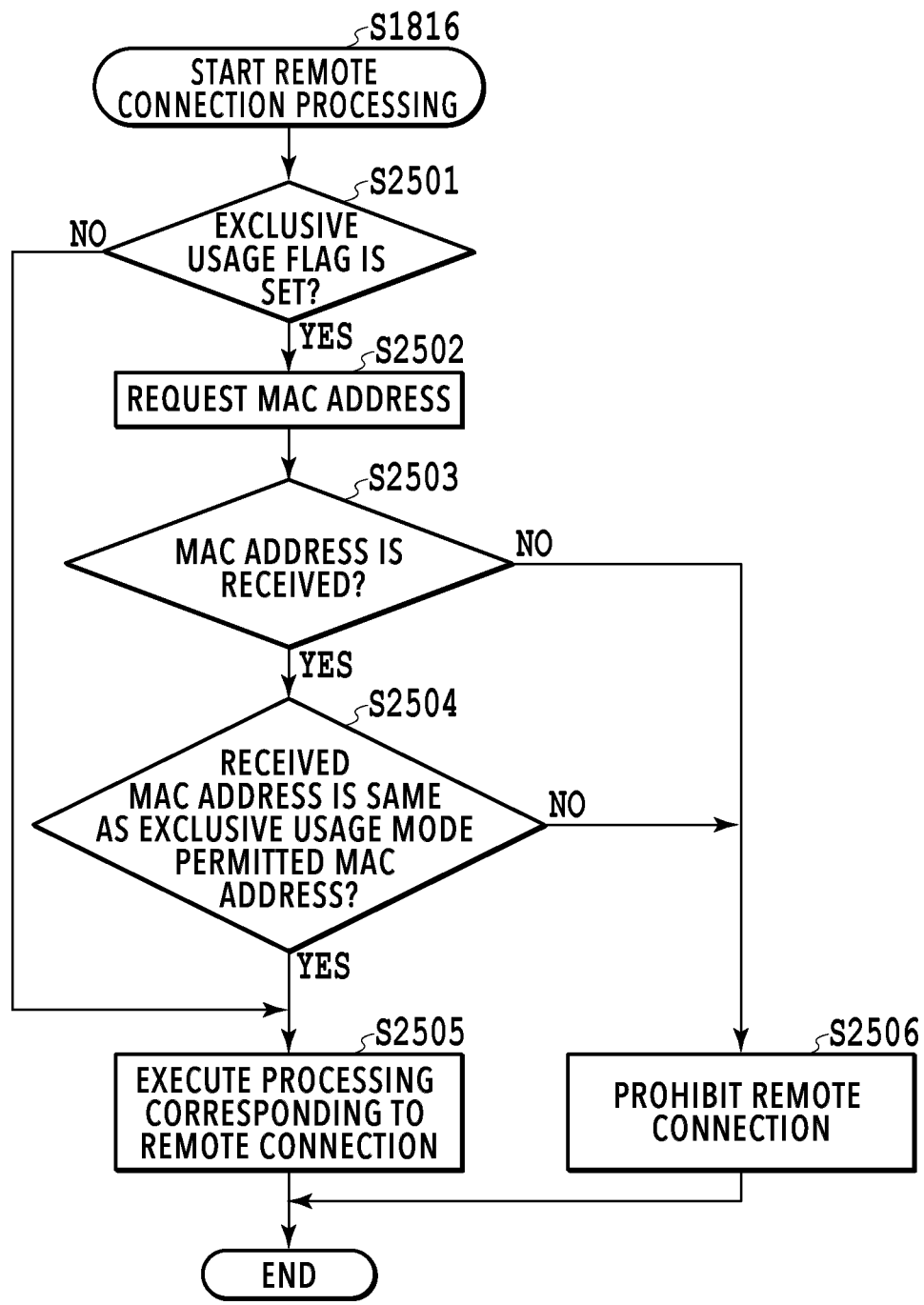
FIG. 25 is a flowchart illustrating remote connection processing of the multifunction peripheral according to the first to fourth embodiments.

With reference to FIG. 25, in the remote connection processing, first, in S2501, the CPU 201 determines whether the exclusive usage flag is set.

In the case where the exclusive usage flag is not set (NO in S2501), the CPU 201 causes the processing to proceed to S2505, and executes the processing corresponding to remote connection.

In the case where the exclusive usage flag is set (YES in S2501), the CPU 201 causes the processing to proceed to S2502, and requests the MAC address from the terminal 103.

Next, in the case where the CPU 201 can receive the MAC address from terminal 103 within a predetermined period (YES in S2503) and the received MAC address is the exclusive usage mode permitted MAC address (YES in S2504), the CPU 201 causes the processing to proceed to S2505. Then, the CPU 201 executes the processing corresponding to remote connection in S2505.

Meanwhile, in the case where the CPU 201 cannot receive the MAC address from the terminal 103 within the predetermined period (NO in S2503), the CPU 201 causes the processing to proceed to S2506, and prohibits the remote connection. Moreover, in the case where the CPU 201 can receive the MAC address from the terminal 103 within the predetermined period (YES in S2503) but the received MAC address is not the exclusive usage mode permitted MAC address (NO in S2504), the CPU 201 causes the processing to proceed to S2506. Then, the CPU 201 prohibits the remote connection in S2506.

Note that the multifunction peripheral 102 may close the normal port simultaneously with the opening of the exclusive usage connection port in the exclusive usage mode. Then, the terminal 103 establishes remote connection with the multifunction peripheral 102 with the exclusive usage connection port being the destination port in the exclusive usage mode. Other terminals attempt to establish remote commutation with the multifunction peripheral 102 with the normal port being the destination port. However, since the normal port is closed, remote connection cannot be established.

4 OPERATION EXAMPLE

4.1 Operation Example 1

Next, description is given of Operation Example 1 of the multifunction peripheral 102 and the terminals 103 and 104 in the exclusive usage permitted period in which the exclusive usage mode permit/prohibit switch 801 (FIG. 8) is switched to "permit" and before and after the exclusive usage permitted period, with reference to FIGS. 8, 9, 16 to 18, and 24 to 26.

First, in S2601, the user switches the exclusive usage mode permit/prohibit switch 801 to "permit" in the screen 800 (FIG. 8) displayed on the operation panel of the multifunction peripheral 102, and the exclusive usage permitted period T1 is thereby started. In this case, the permit flag is set (S1603 (FIG. 16)), and the MAC address of the terminal 103 selected in the screen 900 (FIG. 9) is registered as the exclusive usage mode permitted MAC address (S1604 (FIG. 16)).

Next, in S2602, the terminal 103 is connected to the multifunction peripheral 102 (YES in S1701 (FIG. 17)). The MAC address of the connected terminal 103 is the same as the exclusive usage mode permitted MAC address (YES in S1702 (FIG. 17)), and the permit flag is set (YES in S1703 (FIG. 17)). Accordingly, in S2603, the exclusive usage connection port is opened.

Then, in the case where the printer driver of the terminal 103 is activated in S2604, in S2605, the printer driver of the terminal 103 sends the exclusive usage start request to the multifunction peripheral 102 with the exclusive usage connection port being the destination port.

In the case where the multifunction peripheral 102 receives the exclusive usage start request (YES in S1801, YES in S1802 (FIG. 18)), the multifunction peripheral 102 requests the MAC address of the terminal 103 from the terminal 103 (S1803 (FIG. 18); 51803A (FIG. 26)). In response to this request, the terminal 103 sends the MAC address of the terminal 103 to the multifunction peripheral 102 (S2606).

The multifunction peripheral 102 receives the MAC address (YES in S1804 (FIG. 18)), and the received MAC address is the exclusive usage mode permitted MAC address (YES in S1805 (FIG. 18)). Accordingly, the processing of enabling the exclusive usage mode is performed (S1806 (FIG. 18)). In the processing of enabling the exclusive usage mode, the portion of the operation panel relating to the printing function and the like is disabled (S2301 (FIG. 23); S2301A (FIG. 26)). Moreover, in the processing of enabling the exclusive usage mode, the exclusive usage flag is set (S2302 (FIG. 23); S2302A (FIG. 26)). Furthermore, in the processing of enabling the exclusive usage mode, the display indicating that the multifunction peripheral is operating in the exclusive usage mode is outputted (S2303 (FIG. 23); S2303A (FIG. 26)). The exclusive usage enabled period T2 starts from this moment.

In the exclusive usage enabled period T2, the multifunction peripheral 102 receives the request for remote connection (S2607) from the terminal 104 that is not the exclusive usage terminal (YES in S1815, S1816 (FIG. 18)). However, the exclusive usage flag is set (YES in S2501 (FIG. 25)), and the MAC address obtained from the terminal 104 is different from the exclusive usage mode permitted MAC address (S2502, YES in S2503, NO in S2504 (FIG. 25)). Accordingly, the multifunction peripheral 102 prohibits the remote connection by the terminal 104 (S2506 (FIG. 25); S2506A (FIG. 26)).

Moreover, in the exclusive usage enabled period T2, the multifunction peripheral 102 receives the request for remote connection (S2608) from the terminal 103 (YES in S1815, S1816 (FIG. 18)). In this case, the exclusive usage flag is set (YES in S2501 (FIG. 25)), and the MAC address obtained from the terminal 103 is the same as the exclusive usage mode permitted MAC address (S2502, YES in S2503, YES in S2504 (FIG. 25)). Accordingly, the processing corresponding to remote connection by the terminal 103 is executed (S2505 (FIG. 25); S2505A (FIG. 26)).

Furthermore, in the exclusive usage enabled period T2, the portion of the operation panel relating to the printing function and the like is disabled (S2301 (FIG. 23)). Accordingly, even if the user performs an operation on this portion (S2304 (FIG. 23); 52304A (FIG. 26)), this operation is disabled (S2305 (FIG. 23); S2305A (FIG. 26)).

Moreover, in the exclusive usage enabled period T2, the multifunction peripheral 102 receives the print job (S2609) from the terminal 104 (YES in S1813, S1814 (FIG. 18)). The exclusive usage flag is set (YES in S2401 (FIG. 24)), and the MAC address obtained from the terminal 104 is different from the exclusive usage mode permitted MAC address (S2402, YES in S2403, NO in S2404 (FIG. 24)). Accordingly, the multifunction peripheral 102 cancels the print job received from the terminal 104 (S2406 (FIG. 24); S2406A (FIG. 26)).

Furthermore, in the exclusive usage enabled period T2, the multifunction peripheral 102 receives the print job (S2610) from the terminal 103 (YES in S1813, S1814 (FIG. 18)). Since the exclusive usage flag is set (YES in S2401 (FIG. 24)) and the MAC address obtained from the terminal 103 is the same as the exclusive usage mode permitted MAC address (S2402, YES in S2403, YES in S2404) (FIG. 24)), the print job received from the terminal 103 is executed (S2405 (FIG. 24; S2405A (FIG. 26)).

Next, in the terminal 103, preparation of printer driver termination is started in S2611. In S2612, the printer driver sends the exclusive usage termination request to the multifunction peripheral 102 with the exclusive usage connection port being the destination port. The printer driver is terminated in S2613.

Figure 26:
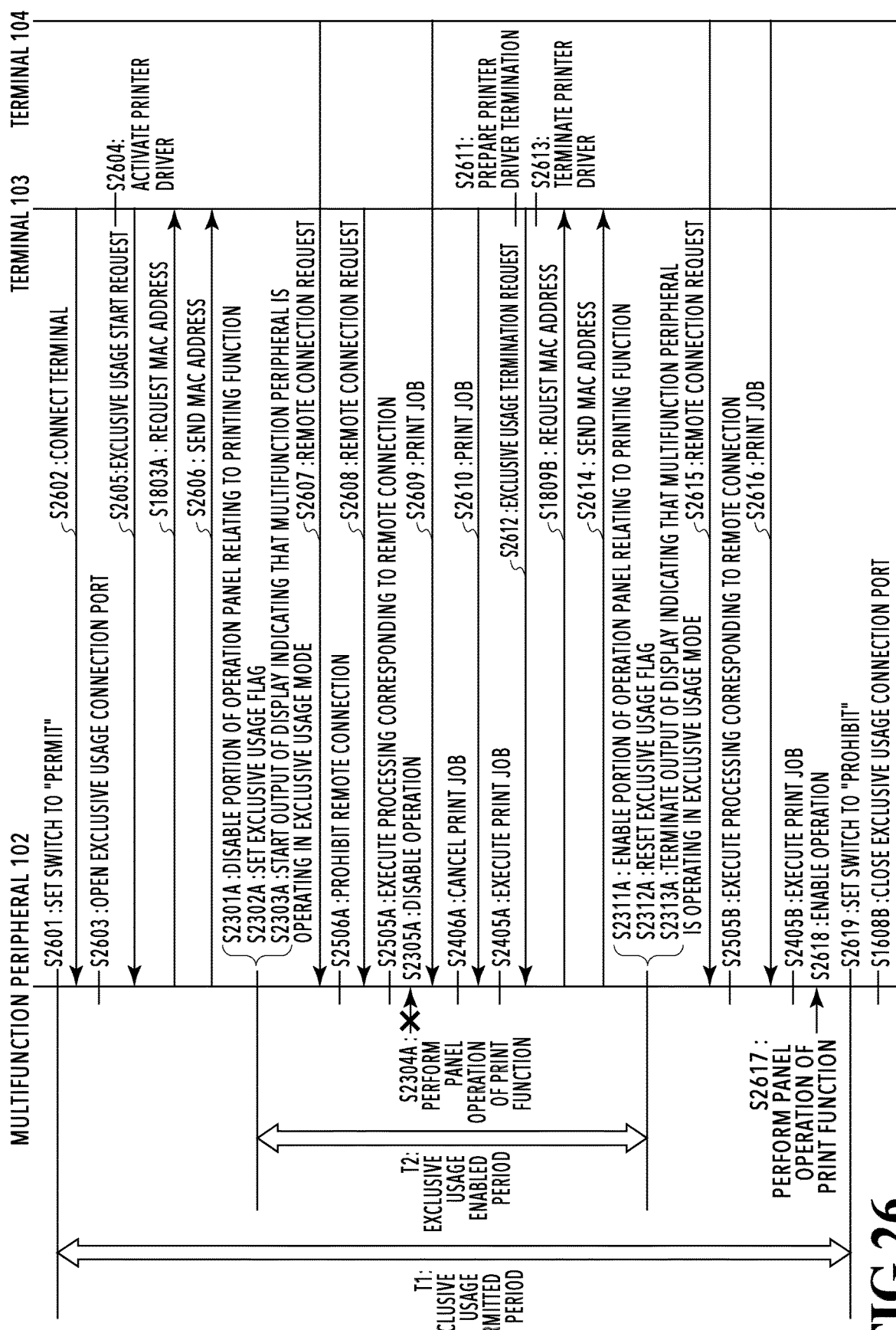
FIG. 26 is a sequence diagram illustrating an operation example of the multifunction peripheral and the terminal according to the first to fourth embodiments.

In the case where the multifunction peripheral 102 receives the exclusive usage termination request (YES in S1801, NO in S1802, YES in S1808 (FIG. 18)), the multifunction peripheral 102 requests the MAC address from the terminal 103 (S1809 (FIG. 18); 51809A (FIG. 26). In response to this request, the terminal 103 sends the MAC address of the terminal 103 to the multifunction peripheral 102 (S2614).

The multifunction peripheral 102 receives the MAC address (YES in S1810 (FIG. 18)). Since the received MAC address is the same as the exclusive usage mode permitted MAC address (YES in S1811 (FIG. 18)), the processing for disabling the exclusive usage mode is performed (S1812 (FIG. 18)). In the processing of disabling the exclusive usage mode, the portion of the operation panel relating to the printing function and the like is enabled (S2311 (FIG. 23); S2311A (FIG. 26)). Moreover, in the processing of disabling the exclusive usage mode, the exclusive usage flag is reset (S2312 (FIG. 23); S2312A (FIG. 26)). Furthermore, in the processing of disabling the exclusive usage mode, the output of the display indicating that the multifunction peripheral is operating in the exclusive usage mode is terminated (S2313 (FIG. 23); S2313A (FIG. 26)). The exclusive usage enabled period T2 ends at this moment.

After the end of the exclusive usage enabled period T2, in the case where the multifunction peripheral 102 receives the request for remote connection (S2615) from the terminal 104 (YES in S1815, S1816 (FIG. 18)), the exclusive usage flag is already reset (NO in S2501 (FIG. 25)). Accordingly, the multifunction peripheral 102 executes processing corresponding to the remote connection by the terminal 104 (S2505 (FIG. 25); S2505B (FIG. 26)).

Moreover, after the end of the exclusive usage enabled period T2, in the case where the multifunction peripheral 102 receives the print job (S2616) from the terminal 104 (YES in S1813, S1814 (FIG. 18)), the exclusive usage flag is already reset (NO in S2401 (FIG. 24)). Accordingly, the multifunction peripheral 102 executes printing according to the print job from the terminal 104 (S2405 (FIG. 24); S2405B (FIG. 26)).

After the end of the exclusive usage enabled period T2, the portion of the operation panel relating to the printing function and the like are enabled (S2311 (FIG. 23)). Accordingly, in the case where the user performs an operation on this portion (S2617), this operation is accepted to be enabled (S2618).

In the case where the user switches the exclusive usage mode permit/prohibit switch 801 to "prohibit" in the screen 800 (FIG. 8) displayed on the operation panel of the multifunction peripheral 102 (S2619), this switching is detected (YES in S1601, NO in S1602 (FIG. 16)). The permit flag is thereby reset (S1608 (FIG. 16)). Moreover, the registration of the exclusive usage mode permitted MAC address is canceled (S1610 (FIG. 16)), the exclusive usage connection port is closed (S1611 (FIG. 16)), and the exclusive usage permitted period T1 ends.

Note that, in the example illustrated in FIG. 26, soon after the connection of the terminal 103 to the multifunction peripheral 102 in S2602, the printer driver activated in S2604 outputs the exclusive usage start request in S2605. However, the present disclosure is not limited to this. For example, the terminal 103 may send the exclusive usage start request to the multifunction peripheral 102 by using a program other than the printer driver, within a predetermined time from the connection of the terminal 103 to the multifunction peripheral 102. Moreover, the terminal 103 may send the exclusive usage start request to the multifunction peripheral 102 by using a program other than the printer driver, in response to an operation by the user who has an intention of starting the exclusive usage mode. Furthermore, the printer driver may send the exclusive usage start request in a period from the activation of the terminal 103 to a moment immediately before the first printing by the printer driver.

In the example illustrated in FIG. 26, the printer driver outputs the exclusive usage termination request to the multifunction peripheral 102 in S2612 that is in a period from the start of the termination preparation in S2611 to the termination in S2613 by the printer driver. However, the present disclosure is not limited to this. For example, the terminal 103 may send the exclusive usage termination request to the multifunction peripheral 102 by using a program other than the printer driver, in termination of the OS of the terminal 103. Moreover, the terminal 103 may send the exclusive usage termination request to the multifunction peripheral 102 by using a program other than the printer driver, in response to an operation by the user who has an intention of terminating the exclusive usage mode.

Moreover, in the third and fourth embodiments, as described above, the multifunction peripheral 102 opens the exclusive usage connection port simultaneously with the start of the exclusive usage permitted period T1, provided that the terminal 103 is connected to the multifunction peripheral 102 before the start of the exclusive usage permitted period T1. In response to this, the printer driver or a program other than the printer driver may output the exclusive usage start request to the multifunction peripheral 102 soon after the start of the exclusive usage permitted period T1.

Furthermore, the terminal 103 may send the exclusive usage start request or the exclusive usage termination request to the multifunction peripheral 102, according to scheduled time or scheduled time and date set by the user.

4.2 Operation Example 2 peripheral 102 and the terminals 103 and 104 in the exclusive usage prohibited period in which the exclusive usage mode permit/prohibit switch 801 (FIG. 8) is switched to "prohibit", with reference to FIGS. 16 to 18, 24, 25, and 27.

Unlike in the example illustrated in FIG. 26, since the exclusive usage mode permit/prohibit switch 801 is switched to "prohibit", there is no exclusive usage permitted period T1. Moreover, although not illustrated in FIG. 27, the following processing is executed in the case where the exclusive usage mode permit/prohibit switch 801 is switched from "permit" to "prohibit" (YES in S1601, NO in S1602 (FIG. 16)). Specifically, the permit flag is reset (S1608 (FIG. 16)), the exclusive usage mode is disabled (S1609 (FIG. 16)), the registration of the exclusive usage mode permitted MAC address is canceled (S1610 (FIG. 16)), and the exclusive usage connection port is closed (S1611 (FIG. 16)). Then, these settings are maintained.

First, in S2701, the terminal 103 is connected to the multifunction peripheral 102 (YES in S1701 (FIG. 17)). Since the exclusive usage mode permitted MAC address that is a target to be compared with the MAC address of the connected terminal 103 is set to an invalid value (NULL) (NO in S1702 (FIG. 17)), the processing returns to S1701 (FIG. 17). Accordingly, the processing does not proceed to S1704 (FIG. 17), and the exclusive usage connection port is maintained to be closed.

Next, in the case where the printer driver of the terminal 103 is activated in S2702, in S2703, the printer driver of the terminal 103 sends the exclusive usage start request to the multifunction peripheral 102 with the exclusive usage connection port being the destination port.

In the multifunction peripheral 102, the exclusive usage connection port is closed. Accordingly, the multifunction peripheral 102 discards the exclusive usage start request sent from the terminal 103 (YES in S1801, NO in S1802, S1808, S1813 and S1815 (FIG. 18)). Thus, the step of requesting the MAC address from the terminal 103 (S1803 (FIG. 18)) and the steps relating to this requesting step (S1804 (FIG. 18) and S1805 (FIG. 18)) are not executed. Moreover, the processing of enabling the exclusive usage mode (S1806 (FIG. 18)) is also not executed. Accordingly, the exclusive usage mode is not enabled by the exclusive usage start request from the terminal 103.

In this case, the printer driver of the terminal 103 that has sent the exclusive usage start request to the multifunction peripheral 102 with the exclusive usage connection port being the destination port waits for the request for the MAC address to be sent to the terminal 103 by the multifunction peripheral 102 in S1803 (FIG. 18). However, as described above, in the present example, since the determination is NO in S1802 (FIG. 18), S1803 (FIG. 18) is not executed. Accordingly, the printer driver of the terminal 103 can know that the exclusive usage connection port is closed, from no sending of the request for the MAC address from the multifunction peripheral 102.

In the present example, in response to this, in S2704, the printer driver of the terminal 103 sets the normal port as the destination port of the print job, and sends the print job to the multifunction peripheral 102. In response to this, since the exclusive usage flag is not set in the multifunction peripheral 102 (NO in S2401 (FIG. 24)), the multifunction peripheral 102 executes the print job (S2405 (FIG. 24); S2405C (FIG. 27)).

Moreover, in S2705, the terminal 103 sets the normal port as the destination port, and sends the remote connection request to the multifunction peripheral 102. In response to this request, since the exclusive usage flag is not set in the multifunction peripheral 102 (NO in S2501), the multifunction peripheral 102 executes the processing by remote connection (S2505 (FIG. 25); S2505C (FIG. 27)).

Next, in S2706, the terminal 104 sets the normal port as the destination portion of the print job, and sends the print job to the multifunction peripheral 102. In response to this, since the exclusive usage flag is not set in the multifunction peripheral 102 (NO in S2401), the multifunction peripheral 102 executes the print job (S2405 (FIG. 24); S2405D (FIG. 27)).

Moreover, in S2707, the terminal 104 sets the normal port as the destination port, and sends the remote connection request to the multifunction peripheral 102. In response to this request, since the exclusive usage flag is not set in the multifunction peripheral 102 (NO in S2501), the multifunction peripheral 102 executes the processing corresponding to remote connection from the terminal 104 (S2505 (FIG. 25); S2505D (FIG. 27)).

5 OTHER EMBODIMENTS

Figure 27:
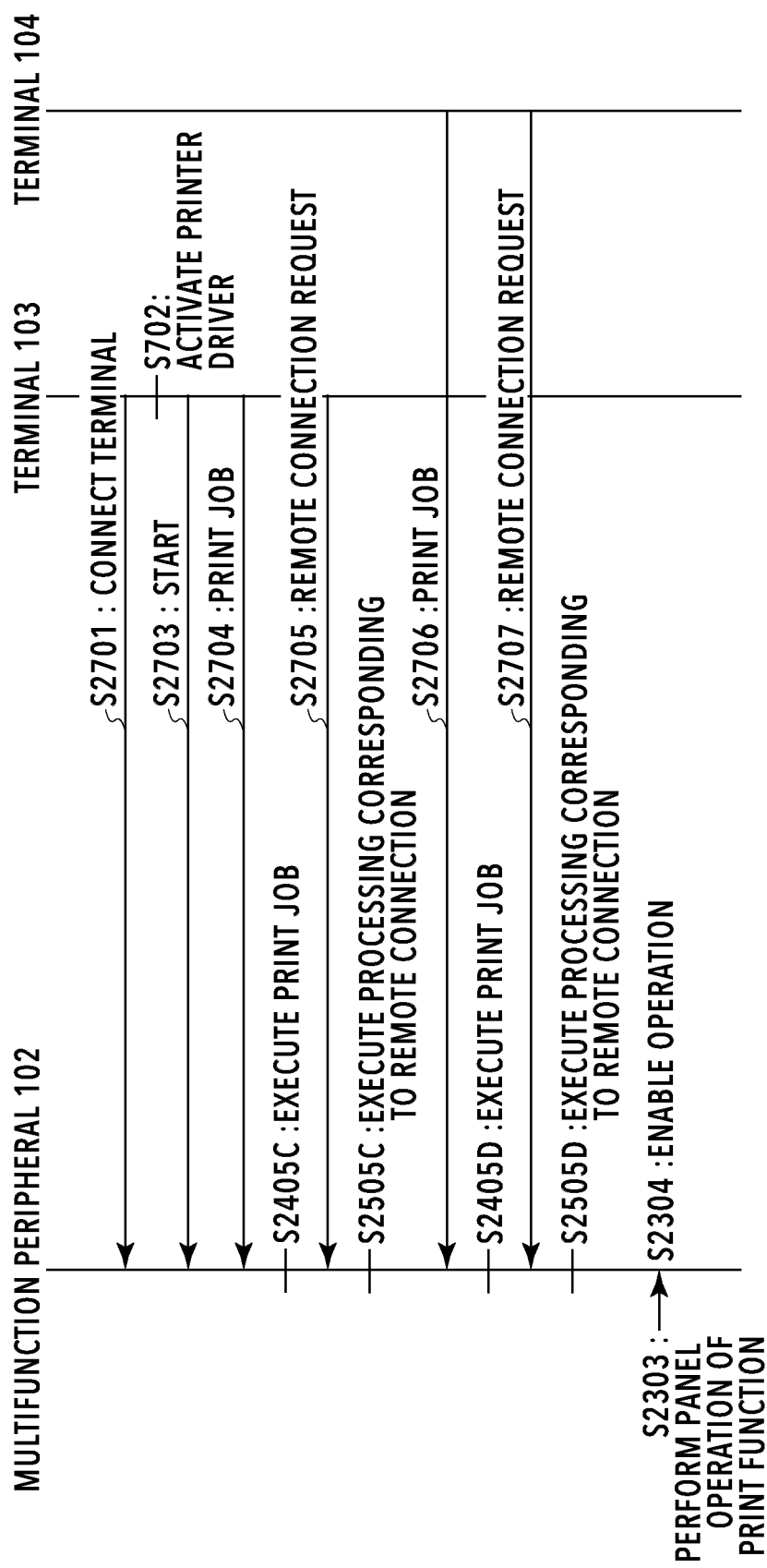
FIG. 27 is a sequence diagram illustrating another operation example of the multifunction peripheral and the terminal according to the first to fourth embodiments.

In Operation Example 2 illustrated in FIG. 27, in the case where the transition to the exclusive usage enabled period cannot be performed even if the terminal 103 outputs the exclusive usage start request, the terminal 103 sets the normal port of the multifunction peripheral 102 as the destination port, and performs the normal printing or the remote connection processing. However, the terminal 103 may cancel the printing or hold back the remote connection processing in the case where the transition to the exclusive usage enabled period cannot be performed even if the terminal 103 outputs the exclusive usage start request, with an emphasis on confidentiality.

According to the processing described with reference to FIGS. 16, 19, and 22, the multifunction peripheral 102 determines whether the exclusive usage flag is reset after the switching of the exclusive usage mode permit/prohibit switch 801 to "prohibit". Then, in the case where the exclusive usage flag is not reset, the multifunction peripheral 102 returns the exclusive usage mode permit/prohibit switch 801 to "permit", and displays the screen 1301 as illustrated in FIG. 13. Alternatively, the exclusive usage mode permit/prohibit switch 801 may be set such that it cannot be switched to "prohibit" in the case where the exclusive usage flag is set. Moreover, in the case where switching of the exclusive usage mode permit/prohibit switch 801 to "prohibit" is attempted, the screen 1301 as illustrated in FIG. 13 may be displayed as a superimposed screen.

In the aforementioned embodiments, in S1604 (FIG. 16), the CPU 201 registers the MAC address of the terminal selected before the pressing of the "OK" button 904 in the screen 900 as illustrated in FIG. 9, as the exclusive usage mode permitted MAC address. In this case, only one terminal is assumed to be selected in the screen 900 as illustrated in FIG. 9. However, the configuration is not limited to this, and selection of multiple terminals may be allowed in the screen 900 as illustrated in FIG. 9. Moreover, in S1604, MAC addresses of multiple terminals may be registered as the exclusive usage mode permitted MAC addresses. In this case, in a situation where S1805 (FIG. 18) is executed for the terminal being the first to be connected to the multifunction peripheral 102 from the start of the exclusive usage permitted period, there are multiple exclusive usage permitted MAC addresses. In this case, the MAC address received from one of the permitted terminals matches one of the exclusive usage mode permitted MAC addresses. Accordingly, the permitted terminal being the first to be connected to the multifunction peripheral 102 from the start of the exclusive usage permitted period is set as the exclusive usage terminal.

Moreover, in a situation where S1805 (FIG. 18) is executed for the terminals being the second and beyond to be connected to the multifunction peripheral 102 from the start of the exclusive usage permitted period, there are similarly multiple exclusive usage mode permitted MAC addresses. Also in this case, the MAC address received from the permitted terminal being the second to be connected to the multifunction peripheral 102 matches one of the exclusive usage mode permitted MAC addresses. Here, it is necessary to avoid the case where the permitted terminal being the second to be connected to the multifunction peripheral 102 from the start of the exclusive usage permitted period becomes the exclusive usage terminal. To this end, it is only necessary to take an avoidance measure of providing a conditional branch as follows between S1805 and S1806: in the case where the exclusive usage flag is currently set, the processing does not proceed to S1806 and instead returns to S1801 via S1807. In the case where this avoidance measure is taken, in the first to fourth embodiments, all registered terminals may be handled as the selected terminals, instead of selecting a portion of the registered terminals that is one or more of the registered terminals in the screen 900 as illustrated in FIG. 9. In other words, all registered terminals may be handled as the selected terminals from the beginning.

Moreover, in the case where only one terminal can be set as the registered terminal, this one registered terminal may be handled as the selected terminal from the beginning without execution of the avoidance measure described above.

In the case where the exclusive usage mode is enabled, printing of contents received by facsimile may be suspended. In this case, the contents may be saved in the RAM 203. The suspension may be displayed on the operation panel. The contents may be printed after the cancelation of the exclusive usage mode as necessary.

Although description is given by using the multifunction peripheral as an example in the aforementioned embodiments, the multifunction peripheral may be replaced by an image forming apparatus.

According to the aforementioned embodiments, it is possible to prevent mixing of paper sheets instructed to be printed by a predetermined user from a predetermined terminal based on a print job or remote connection, with paper sheets instructed to be printed by the other users, in the image forming apparatus or the multifunction peripheral. Moreover, according to the aforementioned embodiments, it is possible to prevent mixing of paper sheets instructed to be printed by a predetermined user from a predetermined terminal based on a print job or remote connection, with paper sheets printed according to an operation made on the operation panel by the other users, in the image forming apparatus or the multifunction peripheral. Furthermore, according to the aforementioned embodiments, it is possible to prevent mixing of paper sheets instructed to be printed by a predetermined user from a predetermined terminal based on a print job or remote connection, with paper sheets on which contents of received facsimile are printed, in the image forming apparatus or the multifunction peripheral. Hence, according to the aforementioned embodiments, it is possible to prevent mixing of classified documents instructed to be printed by a predetermined user, with paper sheets instructed to be printed by the other users, in the image forming apparatus or the multifunction peripheral. Accordingly, it is possible to solve a security problem of classified documents being taken away by the other users.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-134108, filed on Aug. 25, 2022, which is hereby incorporated by reference wherein in its entirety.

What is claimed is:

1. An image forming apparatus comprising:
a display portion;
a memory configured to store instructions; and
a processor communicatively connected to the memory and configured to execute the stored instructions to function as:
a display control unit configured to display, on the display portion, at least one home screen and an exclusive usage mode permit/prohibit switch, the at least one home screen including a plurality of function buttons for executing functions designated by a user, and the exclusive usage mode permit/prohibit switch being provided for setting permission/prohibition of an exclusive usage mode in which the image forming apparatus executes a printing function only in response to a job execution request, related to the printing function, sent from a registered terminal among at least one terminal registered with image forming apparatus, and in which execution of a function related to a scanning function is not prohibited, wherein the plurality of function buttons include at least one function button for executing a function including the printing function and at least one function button for executing a function including the scanning function;
a reception unit configured to receive an enabling request for enabling the exclusive usage mode; and
an enabling unit configured to enable the exclusive usage mode,
wherein the enabling unit, in a case where the enabling request is received from a registered terminal in a state where the exclusive usage mode is enabled by the exclusive usage mode permit/prohibit switch, enables the exclusive usage mode for the registered terminal which has sent the enabling request, and in a case where the enabling request is received from any of other terminals than the at least one registered terminal in the state where the exclusive usage mode is enabled by the exclusive usage mode permit/prohibit switch, does not enable the exclusive usage mode for the any of other terminals which has sent the enabling request,
wherein, in a case where the job execution request is received from the registered terminal which has sent the enabling request, a job related to the printing function is executed, while in a case where the job execution request is received from a terminal other than the registered terminal which has sent the enabling request, execution of a job related to the printing function is prohibited, and
wherein, in the state where the exclusive usage mode is enabled, in a case where a button for causing an execution of a function related to the printing function is operated on the display portion, execution of the function related to the printing function is restricted and the display portion displays that the execution of the function related to the printing function is restricted in an identifiable manner, while in a case where a button for causing an execution of a function related to the scanning function is operated on the display portion, execution of the function related to the scanning function is allowed.

2. The image forming apparatus according to claim 1, wherein, in the exclusive usage mode, remote connection other than remote connection from the registered terminal is not accepted.

3. The image forming apparatus according to claim 1, wherein, in the exclusive usage mode, printing of contents received by facsimile is suspended.

4. The image forming apparatus according to claim 1, wherein an identity of the registered terminal is determined based on a communication device identification number of the terminal.

5. The image forming apparatus according to claim 4, wherein the communication device identification number of the registered terminal is registered inside or outside the image forming apparatus, and is referenceable from the image forming apparatus.

6. The image forming apparatus according to claim 1, wherein the enabling unit does not enable the exclusive usage mode in a case where the request is received but the exclusive usage mode permit/prohibit switch is switched to prohibit.

7. The image forming apparatus according to claim 1, wherein the reception unit receives the request only in a period in which an exclusive usage connection port is open.

8. The image forming apparatus according to claim 7, wherein the exclusive usage connection port is opened in a case where the registered terminal is connected to the image forming apparatus while the exclusive usage mode permit/prohibit switch is switched to permit.

9. The image forming apparatus according to claim 8, wherein the exclusive usage connection port is opened in a case where the exclusive usage mode permit/prohibit switch is switched while the registered terminal is connected to the image forming apparatus.

10. The image forming apparatus according to claim 8, wherein the exclusive usage connection port is closed in a case where a predetermined period elapses from the opening of the exclusive usage connection port but the request is not received via the exclusive usage connection port.

11. The image forming apparatus according to claim 1, wherein the at least one home screen includes at least one of a home screen used for business scene, a home screen used for study scene, and a home screen used for daily life scene.

12. The image forming apparatus according to claim 1, wherein in a case where the function button which is provided for executing a function including the printing function and on which it is displayed in an identifiable manner that the function including the printing function is restricted is operated while the image forming apparatus is in the exclusive usage mode, a screen indicating that the image forming apparatus is in the exclusive usage mode for the registered terminal is displayed in an identifiable manner on the display portion.

13. The image forming apparatus according to claim 1, in a case where image forming apparatus is in the exclusive usage mode when the exclusive usage mode permit/prohibit switch is operated to change from a permit position to a prohibit position, the exclusive usage mode permit/prohibit switch returns to the permit position.

14. The image forming apparatus according to claim 1, wherein the exclusive usage mode is enabled for the registered terminal which sends the enabling request when the exclusive usage mode is disabled.

15. The image forming apparatus according to claim 1, wherein information on a network address of the image forming apparatus is displayed on the display portion, and wherein in a case where an access from a terminal to the network of the image forming apparatus is detected, a screen for inputting a name of the terminal is displayed on a display of the terminal.

16. An exclusive usage mode control method comprising:

displaying, on a display portion, at least one home screen and an exclusive usage mode permit/prohibit switch, the at least one home screen including a plurality of function buttons for executing functions designated by a user, and the exclusive usage mode permit/prohibit switch being provided for setting permission/prohibition of an exclusive usage mode in which the image forming apparatus executes a printing function only in response to a job execution request, related to the printing function, sent from a registered terminal among at least one terminal registered with image forming apparatus, and in which execution of a function related to a scanning function is not prohibited, wherein the plurality of function buttons include at least one function button for executing a function including the printing function and at least one function button for executing a function including the scanning function;

receiving an enabling request for enabling the exclusive usage mode; and enabling the exclusive usage mode, wherein, in enabling the exclusive usage mode, in a case where the enabling request is received from a registered terminal in a state where the exclusive usage mode is enabled by the exclusive usage mode permit/prohibit switch, the exclusive usage mode is enabled for the registered terminal which has sent the enabling request, and in a case where the enabling request is received from any of other terminals than the at least one registered terminal in the state where the exclusive usage mode is enabled by the exclusive usage mode permit/prohibit switch, the exclusive usage mode is not enabled for the any of other terminals which has sent the enabling request, wherein, in the state where the exclusive usage mode is enabled, in a case where the job execution request is received from the registered terminal which has sent the enabling request, a job related to the printing function is executed, while in a case where the job execution request is received from a terminal other than the registered terminal which has sent the enabling request, execution of a job related to the printing function is prohibited, and wherein, in the state where the exclusive usage mode is enabled, in a case where a button for causing an execution of a function related to the printing function is operated on the display portion, execution of the function related to the printing function is restricted and the display portion displays that the execution of the function related to the printing function is restricted in an identifiable manner, while in a case where a button for causing an execution of a function related to the scanning function is operated on the display portion, execution of the function related to the scanning function is allowed.

17. A non-transitory computer readable storage medium storing a program causing a computer having a display portion to function as an image forming apparatus comprising:
- a display control unit configured to display, on the display portion, at least one home screen and an exclusive usage mode permit/prohibit switch, the at least one home screen including a plurality of function buttons for executing functions designated by a user, and the exclusive usage mode permit/prohibit switch being provided for setting permission/prohibition of an exclusive usage mode in which the image forming apparatus executes a printing function only in response to a job execution request, related to the printing function, sent from a registered terminal among at least one terminal registered with image forming apparatus, and in which execution of a function related to a scanning function is not prohibited, wherein the plurality of function buttons include at least one function button for executing a function including the printing function and at least one function button for executing a function including the scanning function;
- a reception unit configured to receive an enabling request for enabling the exclusive usage mode; and
- an enabling unit configured to enable the exclusive usage mode,
- wherein the enabling unit, in a case where the enabling request is received from a registered terminal in a state where the exclusive usage mode is enabled by the exclusive usage mode permit/prohibit switch, enables the exclusive usage mode for the registered terminal which has sent the enabling request, and in a case where the enabling request is received from any of other terminals than the at least one registered terminal in the state where the exclusive usage mode is enabled by the exclusive usage mode permit/prohibit switch, does not enable the exclusive usage mode for the any of other terminals which has sent the enabling request,
- wherein, in a case where the job execution request is received from the registered terminal which has sent the enabling request, a job related to the printing function is executed, while in a case where the job execution request is received from a terminal other than the registered terminal which has sent the enabling request, execution of a job related to the printing function is prohibited, and
- wherein, in the state where the exclusive usage mode is enabled, in a case where a button for causing an execution of a function related to the printing function is operated on the display portion, execution of the function related to the printing function is restricted and the display portion displays that the execution of the function related to the printing function is restricted in an identifiable manner, while in a case where a button for causing an execution of a function related to the scanning function is operated on the display portion, execution of the function related to the scanning function is allowed.

* * * * *